United States Patent
Pan

(10) Patent No.: US 7,653,414 B2
(45) Date of Patent: Jan. 26, 2010

(54) SYSTEM, METHOD, AND DEVICE FOR PROVIDING COMMUNICATIONS USING A DISTRIBUTED MOBILE ARCHITECTURE

(75) Inventor: Shaowei Pan, Kildeer, IL (US)

(73) Assignee: Lemko Corporation, Schaumburg, IL (US)

( * ) Notice: Subject to any disclaimer, the term of this patent is extended or adjusted under 35 U.S.C. 154(b) by 605 days.

(21) Appl. No.: 11/362,395

(22) Filed: Feb. 24, 2006

(65) Prior Publication Data

US 2007/0202847 A1    Aug. 30, 2007

(51) Int. Cl.
*H04M 1/00*    (2006.01)
(52) U.S. Cl. .................. 455/560; 455/561; 455/445
(58) Field of Classification Search ................ 455/428, 455/445, 560–561
See application file for complete search history.

(56) References Cited

U.S. PATENT DOCUMENTS

| | | | | |
|---|---|---|---|---|
| 4,284,848 A * | 8/1981 | Frost | ........................... | 455/465 |
| 5,590,175 A * | 12/1996 | Gallant et al. | ................ | 455/433 |
| 5,734,979 A * | 3/1998 | Lu et al. | ...................... | 455/445 |
| H1918 H | 11/2000 | Hoffpauir et al. | | |
| 6,411,825 B1 | 6/2002 | Csapo et al. | | |
| 6,515,985 B2 | 2/2003 | Shmulevich et al. | | |
| 6,751,207 B1 | 6/2004 | Lee et al. | | |
| 6,760,325 B1 | 7/2004 | Hameleers et al. | | |
| 6,807,431 B2 | 10/2004 | Sayers et al. | | |
| 6,816,706 B1 * | 11/2004 | Hohnstein et al. | ............. | 455/25 |
| 6,871,072 B1 * | 3/2005 | Meche | ........................ | 455/445 |
| 7,136,651 B2 * | 11/2006 | Kalavade | .................... | 455/445 |
| 2001/0036173 A1 | 11/2001 | Shmulevich et al. | | |
| 2001/0055298 A1 | 12/2001 | Baker et al. | | |
| 2002/0058502 A1 | 5/2002 | Stanforth | | |
| 2003/0153343 A1 | 8/2003 | Crockett et al. | | |
| 2004/0018829 A1 | 1/2004 | Raman et al. | | |

\* cited by examiner

*Primary Examiner*—Nick Corsaro
*Assistant Examiner*—Vladimir Magloire
(74) *Attorney, Agent, or Firm*—Toler Law Group

(57) ABSTRACT

An authentication, authorization, and accounting module of a first distributed mobile architecture system is disclosed and includes a destination preference register. The destination preference register includes a preferred call path for calls to be routed outside of a distributed mobile architecture network that is accessible to the first distributed mobile architecture system. The preferred call path can be selected from a group comprising a voice over Internet protocol (VoIP) call path, a mobile switching center (MSC) call path, and an integrated services digital network (ISDN) call path. Further, calls that are placed outside of the distributed mobile architecture network from the first distributed mobile architecture system can be established via the preferred call path. Additionally, calls that are routed outside of the distributed mobile architecture network from a mobile subscriber in communication with the first distributed mobile architecture system can be established via the preferred call path.

21 Claims, 24 Drawing Sheets

| | IMSI | ESN | MDN | Loc | TLDN | Req? | Timer | MSC1 Prefer | ISDN Prefer | VoIP Prefer |
|---|---|---|---|---|---|---|---|---|---|---|
| DMA1 | | | | | | | | | | |
| HLR | IMSI11 | ESN11 | MDN11 | @IP | | y | 4hr | | | |
| IP Addr | IMSI12 | ESN12 | MDN12 | @IP | | y | 4hr | | | |
| GPS Loc | IMSI13 | ESN13 | MDN13 | | TLDN | y | 4hr | @PC | | |
| | IMSI14 | ESN14 | MDN14 | | | n | | | | |
| CLR2 | IMSI21 | ESN21 | MDN21 | NA | NA | | | | | |
| IP Addr | IMSI22 | ESN22 | MDN22 | NA | NA | | | | | |
| GPS Loc | IMSI23 | ESN23 | MDN23 | NA | NA | | | | | |
| NB List | IMSI24 | ESN24 | MDN24 | NA | NA | | | | | |
| CLR3 | IMSI31 | ESN31 | MDN31 | NA | NA | | | | | |
| IP Addr | IMSI32 | ESN32 | MDN32 | NA | NA | | | | | |
| GPS Loc | IMSI33 | ESN33 | MDN33 | NA | NA | | | | | |
| NB List | IMSI34 | ESN34 | MDN34 | NA | NA | | | | | |
| VLR | IMSIa | ESNa | NA | NA | TLDNa | y | 4hr | @PC | | |
| | IMSIb | ESNb | NA | NA | TLDNb | y | 4hr | @PC | | |
| | IMSIc | ESNc | NA | NA | TLDNc | y | 4hr | @PC | | |
| | Partial MDN | Prefer 1 | Prefer 2 | Prefer 3 | | | | | | |
| DPR | P1-MDN | MSC | ISDN | VoIP | | | | | | |
| | P2-MDN | ISDN | MSC | VoIP | | | | | | |
| | P3-MDN | VoIP | ISDN | MSC | | | | | | |

FIG. 5

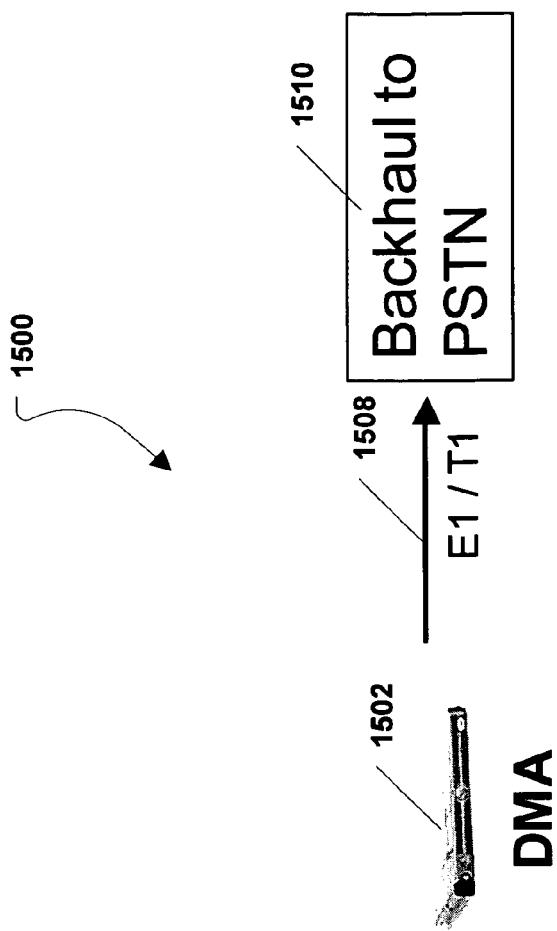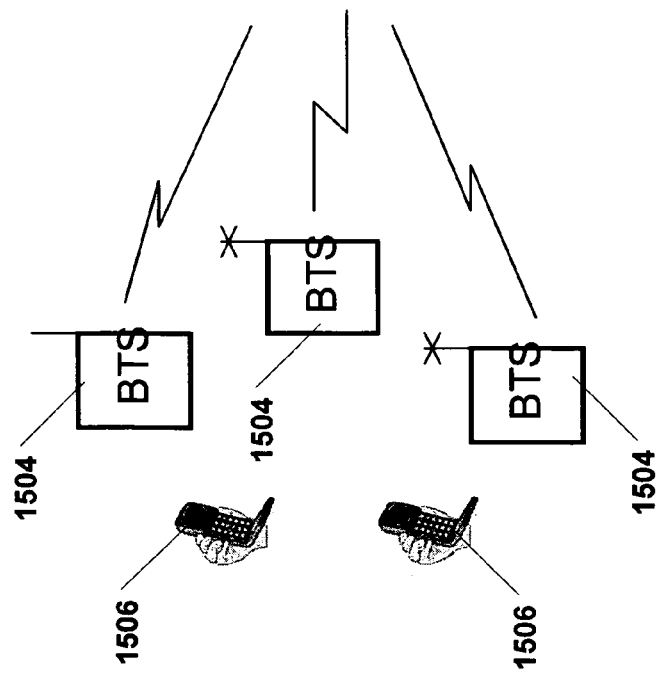
FIG. 15

SYSTEM, METHOD, AND DEVICE FOR PROVIDING COMMUNICATIONS USING A DISTRIBUTED MOBILE ARCHITECTURE

FIELD OF THE DISCLOSURE

The present disclosure relates generally to the distributed mobile communication systems.

BACKGROUND

Access to basic telephony service is particularly important for rural and isolated communities. Telephony access allows small-scale enterprises, cooperatives, and farmers to obtain accurate information on fair prices for their products and to access regional and national markets. Access also reduces the cost of transportation and supports the local tourist industry. By bringing markets to people via telecommunications, rather than forcing people to leave in search of markets, urban migration is reduced and greater income and employment potential are generated in rural areas.

Unfortunately, the last decade of the telecommunications boom has not alleviated the disparities between urban and rural communities. The average imbalance, in terms of telephone penetration, in Asia, for example, is over ten to one and is often as high as twenty to 1.2. This means that a country whose urban markets have a penetration of four (4) telephone lines per one-hundred (100) inhabitants, e.g., India and Pakistan, has a rural penetration of less than 0.2 per one-hundred (100). The situation is more acute in most African countries and in some parts of Latin America. By comparison, the disparity in average income level between urban and rural residents in the developing world is usually less than 4 to 1.

Current telephone systems are expensive to deploy. For example, a typical cellular system that includes a mobile switching center (MSC), a base station controller (BSC), and a home location register/visitor location register (HLR/VLR) can cost over $2.0 million. Moreover, such a system may require a minimum of ten thousand users in order to be economically viable. In many rural areas, the population is not large enough to support the installation of such a system. Further, in many cases, the conditions in which the equipment, e.g., the MSC, BSC, and HLR/VLR, are to be operated are extremely harsh and environmentally challenging. An alternative to such a cellular system can include a wired system, but the costs associated with deploying and maintaining land lines are too high for certain rural areas.

Accordingly, there exists a need for an improved communications system that is relatively inexpensive to deploy and relatively inexpensive to operate.

BRIEF DESCRIPTION OF THE DRAWINGS

The present invention is pointed out with particularity in the appended claims. However, other features are described in the following detailed description in conjunction with the accompanying drawings in which:

FIG. 5 is a diagram of an exemplary data structure for use by an authentication, authorization, and accounting module of a distributed mobile architecture;

FIG. 15 is a diagram of a communication system in which a single distributed management architecture server can be connected to plural base transceiver stations and can provide a single backhaul to the public switched telephone network;

DETAILED DESCRIPTION OF THE DRAWINGS

Figure 1:
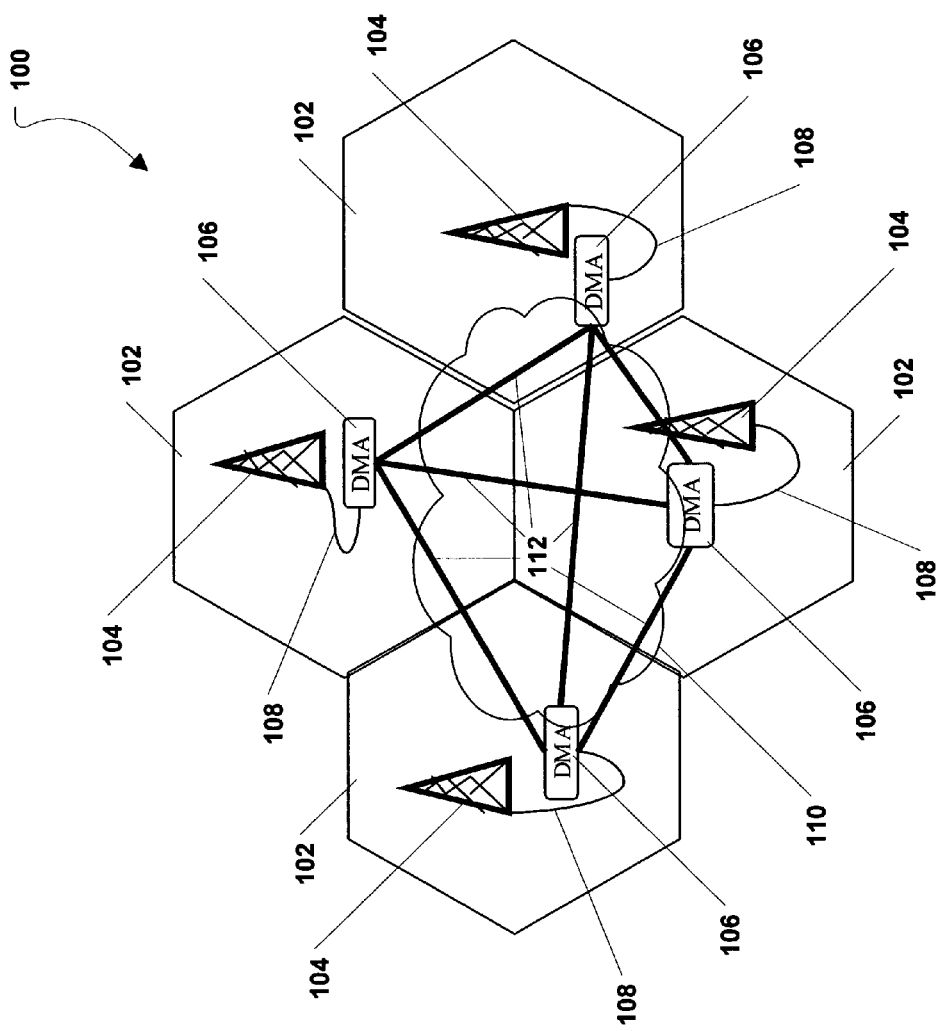
FIG. 1 is a diagram of a distributed and associative communication system.

An authentication, authorization, and accounting module of a first distributed mobile architecture system is disclosed and includes a destination preference register. The destination preference register includes a preferred call path for calls to be routed outside of a distributed mobile architecture network that is accessible to the first distributed mobile architecture system.

In a particular embodiment, the preferred call path is selected from a group comprising a voice over Internet protocol (VoIP) call path, a mobile switching center (MSC) call path, and an integrated services digital network (ISDN) call path. Further, in a particular embodiment, calls that are placed outside of the distributed mobile architecture network from the first distributed mobile architecture system are established via the preferred call path. Additionally, in another particular embodiment, calls that are routed outside of the distributed mobile architecture network from a mobile subscriber in communication with the first distributed mobile architecture system are established via the preferred call path.

In a particular embodiment, the destination preference register includes a first preferred call path, a second preferred call path, and a third preferred call path. Some calls that are routed outside of the distributed mobile architecture network are made via a first available preferred call path. In a particular embodiment, the module also includes a home location register that includes information associated with one or more mobile subscribers registered with the first distributed mobile architecture system, and wherein the home location register provides information related to a first community location register at a second distributed mobile architecture system.

In a particular embodiment, the module also includes a second community location register that includes information associated with one or more mobile subscribers registered with the second distributed mobile architecture system. Also, the module can includes a third community location register that includes information associated with one or more mobile subscribers registered with a third distributed mobile architecture system.

In another particular embodiment, the module includes a visitor location register that includes information associated with one or more roaming mobile subscribers that are temporarily registered with the first distributed mobile architecture system.

In another embodiment, a method of communication is disclosed and includes receiving a call directed to a destination mobile directory number that is not available within a community location register within a distribute mobile architecture and matching a prefix of the mobile directory number to a mobile directory number prefix within a destination preference register.

In yet another embodiment, a distributed mobile architecture device is provided and includes a processor and a computer readable medium that is accessible to the processor. An authentication, authorization, and accounting module is embedded within the computer readable medium and includes a destination preference register. The destination preference register includes at least one preferred call path associated with calls to be placed outside a distributed mobile architecture network that is accessible from one or more distributed mobile architecture devices.

In still another embodiment, a system is disclosed and includes a distributed mobile architecture network that includes a first distributed mobile architecture device, a second distributed mobile architecture that is coupled to the first distributed mobile architecture, and a third distributed mobile architecture that is coupled to the first distributed mobile architecture and to the second distributed mobile architecture. Further, a voice over Internet protocol (VoIP) interface can be coupled to the first distributed mobile architecture, the second distributed mobile architecture, or the third distributed mobile architecture. An integrated services digital network (ISDN) interface can be coupled to the first distributed mobile architecture, the second distributed mobile architecture, or the third distributed mobile architecture. Also, a mobile switching center (MSC) interface can be coupled to the first distributed mobile architecture, the second distributed mobile architecture, or the third distributed mobile architecture. In this embodiment, the first distributed mobile architecture, the second distributed mobile architecture, and the third distributed mobile architecture can each include a destination preference register that includes at least one preferred interface supporting calls to be placed outside the distributed mobile architecture network.

Referring to FIG. 1, a non-limiting, exemplary embodiment of a distributed and associative telecommunications system is illustrated and is generally designated 100. As depicted in FIG. 1, the system 100 includes four cellular coverage sites 102. Each coverage site 102 includes an antenna 104. In one embodiment, the antenna 104 is connected to a transceiver belonging to a base transceiver station (BTS) and the BTS is a 3-sector BTS. FIG. 1 also indicates that a distributed mobile architecture (DMA) 106 can be connected to each antenna 104. In one embodiment, each DMA 106 is physically and directly connected to its respective antenna 104, e.g., by a wire or cable 108. Further, in an illustrative embodiment, each DMA 106 can include the components described herein in conjunction with FIG. 3.

As illustrated in FIG. 1, each DMA 106 is interconnected with the other DMAs 106 via an Internet protocol network 110. As such, there exists a peer-to-peer connection 112 between each DMA 106 in the system 100. The DMAs 106 can handle telephony traffic that is communicated at each antenna 104. For example, the DMAs 106 can switch and route calls received via each antenna 104. Additionally, the DMAs 106 can hand-off calls to each other as mobile communication devices move around and between the cellular coverage sites 102. The DMAs 106 can communicate with each other via the IP network 110 and can further transmit calls to each other via the IP network 110. It should be understood that more than four cellular coverage sites 102 can be included in the system and that the inclusion of only four cellular coverage sites 102 in FIG. 1 is merely for clarity and explanation purposes.

Within the distributed and associative communications system 100, the controlling logic can be distributed and de-centralized. Moreover, the wireless coverage provided by the disclosed system 100 is self-healing and redundant. In other words, due to the interconnectivity via the IP network 110, if one or more of the DMAs 106 loses power, fails, or is otherwise inoperable, telephony traffic handled by the inoperable DMA 106 can re-routed to one of the remaining operable DMAs 106. Additionally, user data stored in a database, e.g., a home locator resource (HLR) or a visitor locator resource (VLR), can be distributed equally and fully among all of the DMAs 106. It can also be appreciated that new cellular coverage sites can be easily added to the system 100 as the demand for users increases. Specifically, a DMA can be deployed, connected to an antenna, connected to the IP network, and activated to provide cellular coverage in a new area.

Figure 2:
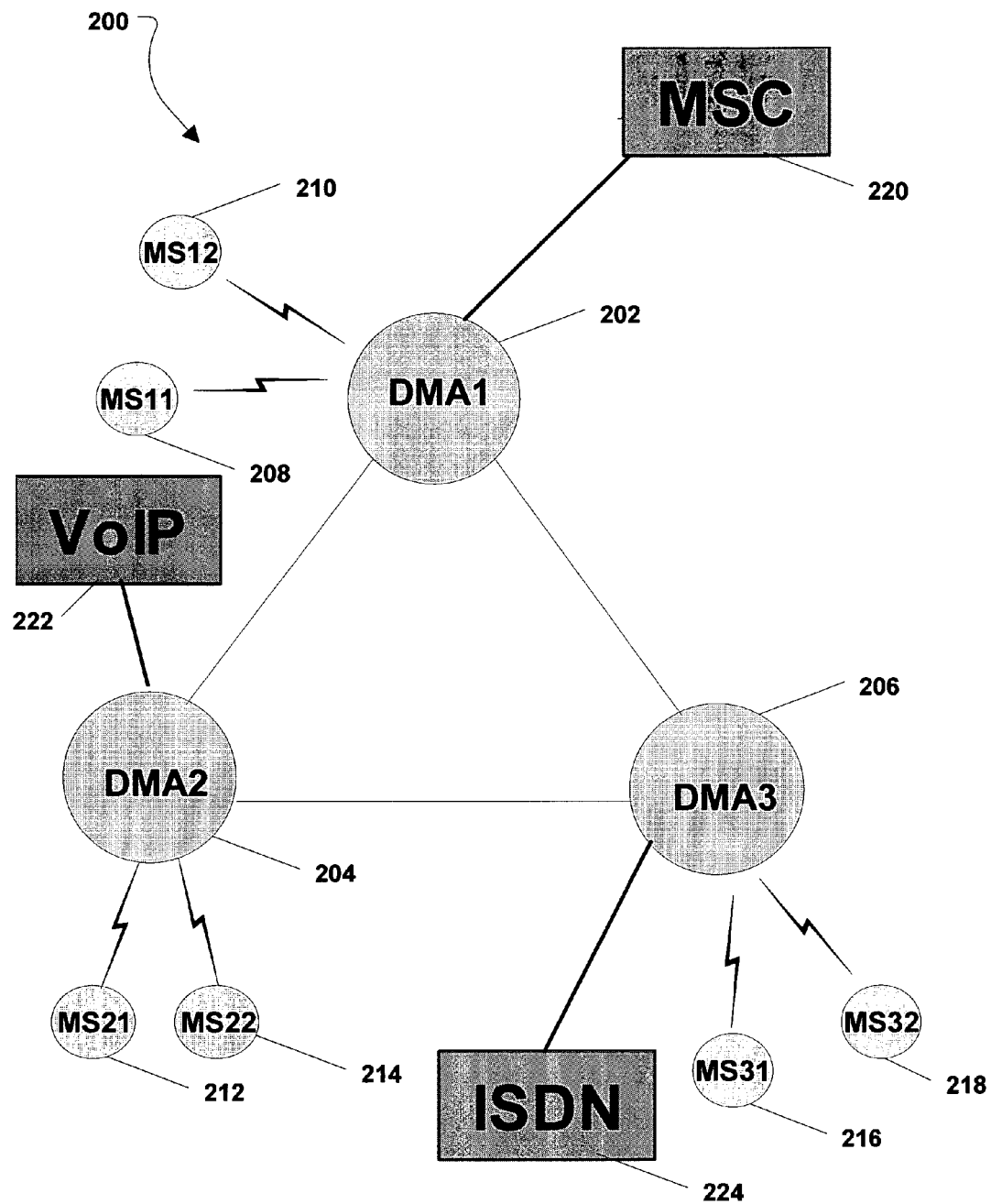
FIG. 2 is a diagram of a network including a plurality of distributed mobile architectures.

FIG. 2 shows an exemplary, non-limiting embodiment of a network system, generally designated 200, that includes a plurality of DMAs. As illustrated in FIG. 2, the system 200 can include an Internet protocol (IP) peer-to-peer network that includes a first distributed mobile architecture 202 that is coupled to a second distributed mobile architecture 204 and to a third distributed mobile architecture 206. Further, the second distributed mobile architecture 204 is coupled to the third distributed mobile architecture 206.

Figure 3:
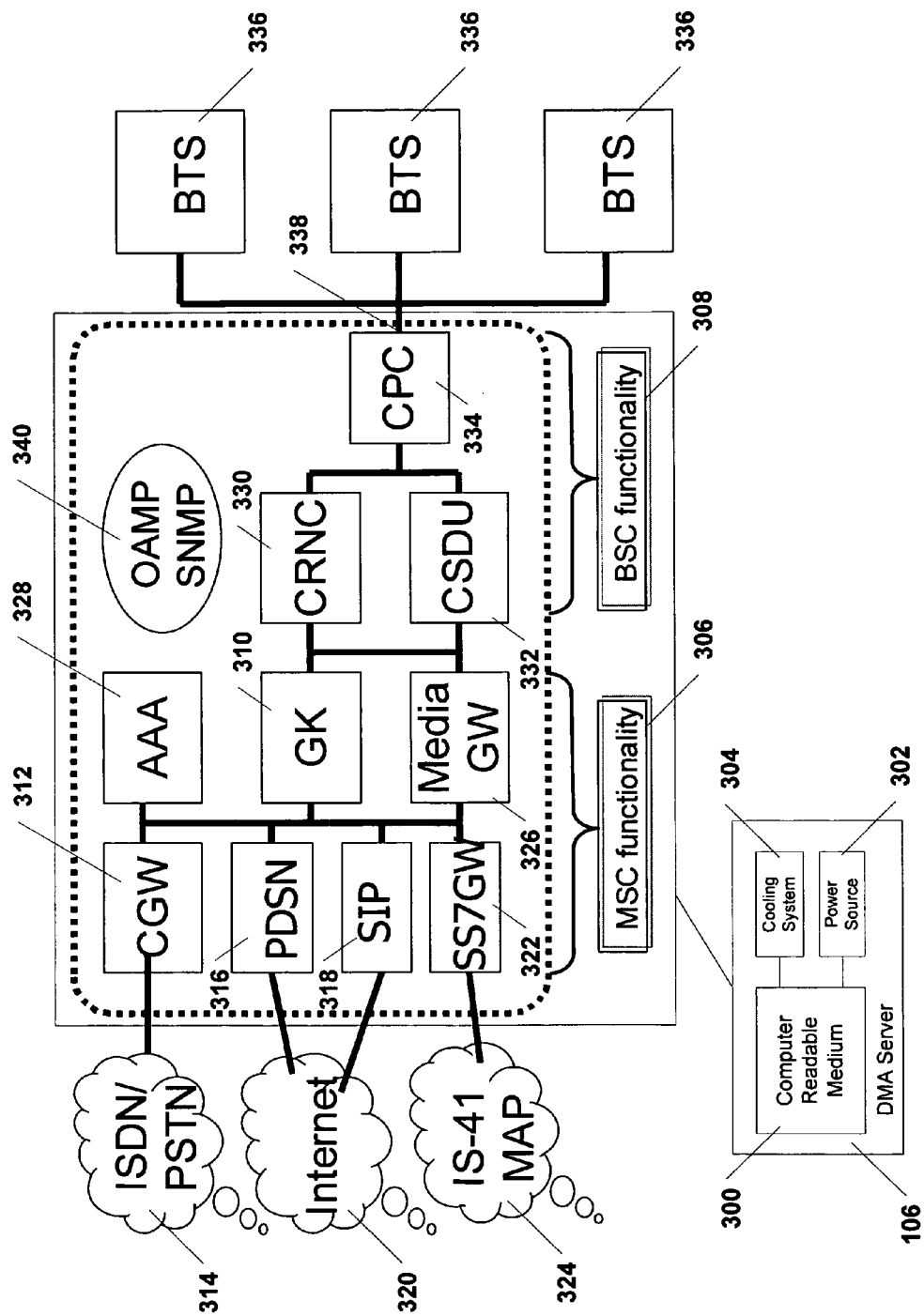
FIG. 3 is a block diagram of a distributed management architecture server.

As shown in FIG. 2, a first mobile subscriber 208 and a second mobile subscriber 210 are wirelessly coupled to the first distributed mobile architecture 202. A first mobile subscriber 212 and a second mobile subscriber 214 are wirelessly coupled to the second distributed mobile architecture 204. Additionally, a first mobile subscriber 216 and a second mobile subscriber 218 are wirelessly coupled to the third distributed mobile architecture 206. FIG. 3 further indicates that a mobile switching center (MSC) interface 220 can be coupled to the first distributed mobile architecture 202 to provide access to a mobile telephone network, such as a cellular telephone network. Further, a voice over Internet protocol (VoIP) interface 222 is coupled to the second distributed mobile architecture 204 to provide access to a VoIP network. FIG. 3 also shows that an integrated services digital network (ISDN) interface 224 can be coupled to the third distributed mobile architecture 206 to provide connectivity to an ISDN.

In a particular embodiment, as described in detail herein, a mobile subscriber can communicate with another mobile subscriber via the first distributed mobile architecture 202, the second distributed mobile architecture 204, or the third distributed mobile architecture 206. Further, in a particular embodiment, a mobile subscriber can communicate with another mobile subscriber via the first distributed mobile architecture 202 and the second distributed mobile architecture 204, the first distributed mobile architecture 202 and the third distributed mobile architecture 206, and the second distributed mobile architecture 204 and the third distributed mobile architecture 206. Additionally, in a particular embodiment, a mobile subscriber can communicate with another mobile subscriber via the first distributed mobile architecture 202, the second distributed mobile architecture 204, or the third distributed mobile architecture 206.

Further, in a particular embodiment, the first mobile subscriber 210 of the first DMA 202 can be connected locally to the second mobile subscriber 210 of the first DMA 202 after locating the second mobile subscriber 210 within the a home location register (HLR) within the first DMA 202. Additionally, the first or second mobile subscriber 210, 212 of the first DMA 202 can be connected to the first or second mobile subscriber 212, 214 of the second DMA 204 after locating the first or second mobile subscriber 212, 214 of the second DMA 204 within a second community location register (CLR) associated with the second DMA 202 that is stored within the first DMA 202. Moreover, the first or second mobile subscriber 210, 212 of the first DMA 202 can be connected to the first or second mobile subscriber 216, 218 of the third DMA 206 after locating the first or second mobile subscriber 216, 218 of the third DMA 206 within a third community location register (CLR) associated with the third DMA 206 that is stored within the first DMA 202.

As a mobile subscriber roams into a coverage area that is not provided by the DMA to which the mobile subscriber is registered, the mobile subscriber can be temporarily registered with a new DMA while the mobile subscriber is roaming. CLR information concerning the roaming mobile subscriber can be obtained from the new DMA in order to complete a call to the roaming mobile subscriber.

In another particular embodiment, calls can be made from a mobile subscriber to an external destination, i.e., external to the DMA network, vie the MSC interface 220, the VoIP interface 222, or the ISDN interface 224. A user can create a preferred hierarchy of interfaces to make calls external to the DMA network. As such, a user can indicate that all calls made from a mobile subscriber to an external device are to be established via the VoIP interface 222. If the VoIP interface 222 is unavailable, a second preferred interface can be used to establish the external call.

FIG. 3 shows an exemplary, non-limiting, embodiment of a DMA, e.g., one of the DMAs 106 described in conjunction with FIG. 1 or one of the DMAs 202, 204, 206 shown in FIG. 2. In a particular embodiment, the DMA 106 includes a processor, or computer, having a housing and a computer readable medium 300 that is disposed therein. A power supply 302 can also be disposed within the housing of the DMA 106 in order to provide power to the DMA 106. The power supply 302 can be a rechargeable battery disposed within the DMA 106 or it can be external to the DMA 106, i.e., a standard power outlet. Moreover, a cooling system 304, e.g., a fan with a thermostat, can be within the DMA 106 in order to keep the DMA 106 from overheating. In an alternative embodiment, the DMA 106 can be a single board processor that does not require a fan.

As depicted in FIG. 3, the DMA 106 can include a mobile switching center (MSC) module 306 and a base station controller (BSC) module 308 embedded within the computer readable medium 300. In an exemplary, non-limiting embodiment, the MSC module 306 can include a gatekeeper (GK) 310 that is connected to several gateways. For example, a circuit gateway (CGW) 312 can be connected to the GK 310 and can provide connectivity to an integrated services digital network/public switched telephone network (ISDN/PSTN) interface 314. The CGW 312 can provide a circuit switched to packet data conversion. In an exemplary, non-limiting embodiment, the PSTN portion of the ISDN/PSTN interface 314 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 314.

As further illustrated in FIG. 3, a packet data service node (PDSN) gateway 316 for CDMA, or a Gateway GPRS Support Node (GGSN) for Global System for Mobile Communication (GSM), and a Session Initiation Protocol (SIP) gateway 318 can also be connected to the GK 310. The PDSN gateway 316 and the SIP gateway 318 can provide connectivity to an Internet protocol (IP) interface 320. Further, the PDSN gateway 316 or a GGSN can establish a reverse tunnel with the PDSN or GGSN gateway 316 using generic routing encapsulation (GRE). Moreover, the PDSN gateway 316, or GGSN, can implement the Pseudo Random Function (PRF)/Foreign Agent (FA) functionality of the DMA 106 which supports mobile IP functions.

FIG. 3 further shows an SS7 gateway 322 that provides connectivity to an ANSI-41 and GSM Mobile Application Part (MAP) interface 324. In a particular embodiment, the ANSI-41 interface can be an SS7 TCAP/SCCP interface on the same SS7 link set used for ISUP signaling. The same SS7 point code can be used to identify the DMA 106 in the ANSI-41 network. The ANSI-41 interface can be used for roamer registration. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MAP/x protocols are not stacked—they are used independently.

As depicted in FIG. 3, a media gateway 326 can also be coupled to the GK 310. In an exemplary, non-limiting embodiment, the media gateway 326 can include cellular transcoders, one or more intranet gateways, conferencing bridges, and group calling functionality. Further, an authentication, authorization, and accounting (AAA) module 328 can be coupled to the GK 310. In an exemplary, non-limiting embodiment, there are three levels of authentication management. The highest level is for administration, the mid-level is for operations, and the lowest level is for normal users. The functions of the AAA module 328 can be included in the user level.

In an exemplary, non-limiting embodiment, the GK 310 can act as an AAA server and a feather server to support advanced supplementary service, short message service, etc. Moreover, the GK 310 can act as a call manager and can support ISUP and PSTN function calls. Additionally, the GK 310 can act as a signal gateway, e.g., IP to SS7 inter-working, ISUP, GSM MAP or ANSI-41 to PSTN and ANSI-42/GSM. The GK 310 can also function as a data call server.

As illustrated in FIG. 3, the BSC module 308 includes a cellular radio network controller (CRNC) 330 and a cellular selection/distribution unit (CSDU) 332 that are connected to a call protocol controller (CPC) 334. In turn, the CPC 334 can be connected to a plurality of base transceiver stations (BTSs) 336. Specifically, the DMA 106 includes a BTS interface 338 at the CPC 334 that can be physically and directly connected to the BTSs 336. The CRNC 330 can provide cellular radio resource management and cellular call control. The CSDU 332 can provide Fundamental Channel (FCH) soft handoff and distribution, Link Access Control (LAC) processing for inband signaling, multiplexer (MUX) functions, and centralized power control. Further, the CPC 334 can convert a T1 or E1 message or ATM interface to a data packet message. In a particular embodiment, each BTS 336 supports signals and traffic up to the front point of the CPC 334, e.g., up to the BTS interface 338. Further, in a particular embodiment, the CRNC 330, the CPC 334, the CSDU 332 and the OAMP 340 can perform one or more of the functions of legacy Base Station Controllers (BSC).

In an exemplary, non-limiting embodiment, the BTS interface 338 can be an IS-95A OR IS-2000 interface over E1 or ATM, or the BTS interface 338 can be a GSM BTS interface using Abis or an UMTS Iub interface or customized application for mobile network enhanced logic (CAMEL). In an illustrative embodiment, the CPC 334 can be connected to one or more BTSs 336. FIG. 3 further shows that the BSC module 308 includes an operations, administration, maintenance, and provisioning (OAMP) module 340. In an exemplary, non-limiting embodiment, the OAMP module 340 can use simple network management protocol (SNMP) for operations interfaces. Further, the OAMP module 340 can include a JAVA user interface. The OAMP module 340 can also include a software agent that is assigned to each component within the DMA 106. The agents independently monitor their respective components. Moreover, each agent can provision its respective component.

In a particular embodiment, a DMA can be implemented as a system or a device. For example, a DMA system or a DMA device can include a DMA server or an DMA on board processor.

Figure 4:
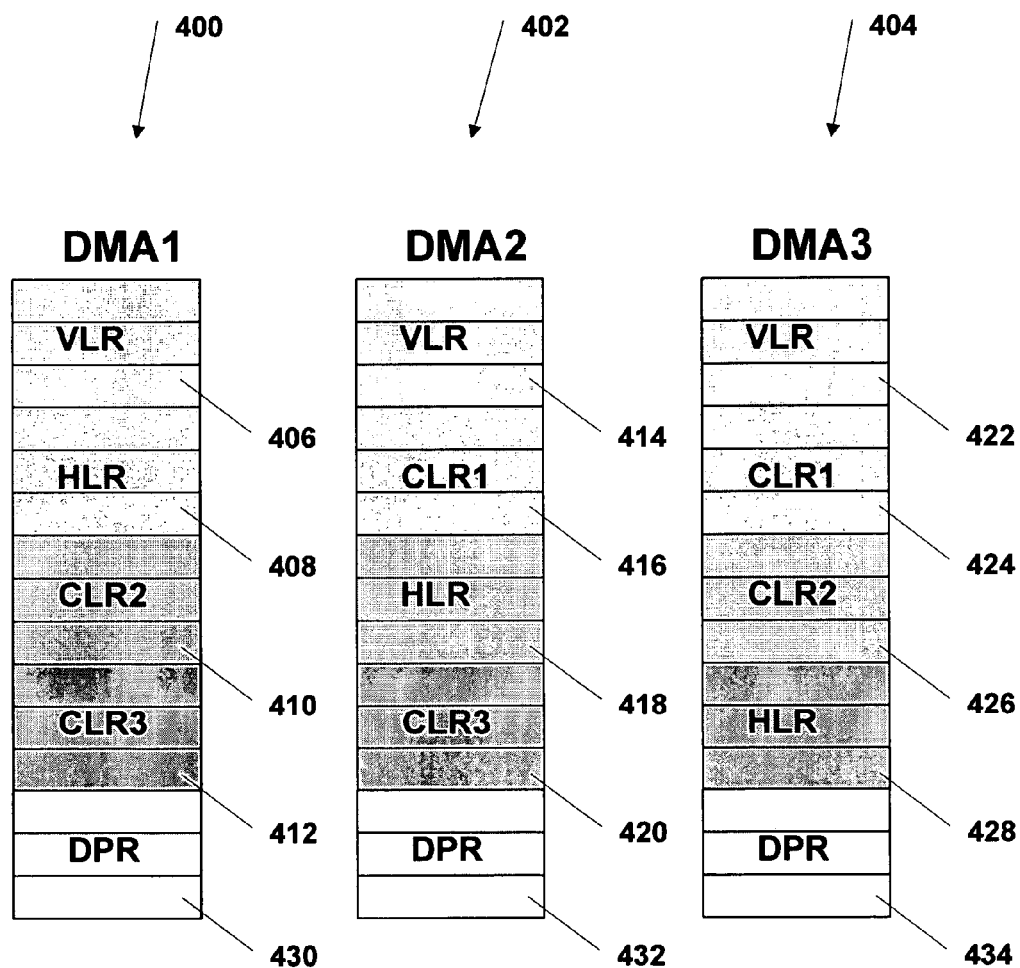
FIG. 4 is a diagram of a plurality of distributed mobile architectures.

FIG. 4 depicts a plurality of DMAs. Particularly, FIG. 4 depicts a first DMA 400, a second DMA 402, and a third DMA 404. FIG. 4 indicates that, in general, each DMA 400 includes a visitor location register (VLR), a home location register (HLR), and at least one community location register (CLR). In a particular embodiment, the VLR, HLR, and the CLR within each DMA 400, 402, 404 are part of an AAA module within each DMA 400, 402, 404. For example, the HLR, VLR, and CLR may be within the AAA module 328 of the exemplary DMA of FIG. 3.

In a particular embodiment, as indicated in FIG. 4, the first DMA 400 includes a VLR 406, an HLR 408, a second CLR 410, and a third CLR 412. Further, the second DMA 402 includes a VLR 414, a first CLR 416, an HLR 418, and a third CLR 420. Additionally, the third DMA 404 includes a VLR 422, a first CLR 424, a second CLR 426, and an HLR 428.

In an exemplary, non-limiting embodiment, the first CLR 416 within the second DMA 402 and the first CLR 424 within the third DMA 404 correspond to the HLR 408 of the first DMA 400. More particularly, the first CLR 416 within the second DMA 402 and the first CLR 424 within the third DMA 404 include information that is stored within the HLR 408 of the first DMA server 400.

Additionally, in an exemplary, non-limiting embodiment, the second CLR 410 within the first DMA 400 and the second CLR 426 within the third DMA 404 correspond to the HLR 418 of the second DMA 402. More particularly, the second CLR 410 within the first DMA 400 and the second CLR 426 within the third DMA 404 include the information that is stored within the HLR 418 of the second DMA server 402.

Also, in an exemplary, non-limiting embodiment, the third CLR 412 within the first DMA 400 and the third CLR 420 within the second DMA 402 correspond to the HLR 428 of the third DMA 404. More particularly, the third CLR 412 within the first DMA 400 and the third CLR 420 within the second DMA 402 include the information that is stored within the HLR 428 of the third DMA server 404.

FIG. 4 further indicates that the first DMA 400 can include a destination preference register (DPR) 430. Also, the second DMA 402 can include a DPR 432. Moreover, the third DMA 404 can also include a DPR 434. In a particular embodiment, each DPR 430, 432, 434 includes a preference for a call path to be used to place calls outside of a DMA network provided by the DMAs 400, 402, 404. In a particular embodiment, the preference is established for each mobile subscriber registered with the DMA network. In another embodiment, the preference is established for each DMA within the DMA network.

Referring to FIG. 5, an exemplary, non-limiting embodiment of an authentication, authorization, and accounting (AAA) module is shown and is generally designated 500. The AAA module depicted in FIG. 5 can be embedded within any of the DMAs that are described herein. As indicated in FIG. 5, the AAA module 500 includes data associated with an HLR 502, a second CLR 504, a third CLR 506, and a VLR 508. As shown, the HLR 502 data includes a plurality of IP addresses that can be used to establish one or more telephone calls within a first DMA in which the AAA module 500 is embedded. The HLR 502 data further includes a GPS location of the first DMA in which the AAA 500 is embedded.

As illustrated in FIG. 5, the second CLR 504 and the third CLR 506 include one or more IP addresses that can be used to establish one or more telephone calls via a second and third DMA that are coupled to the first DMA in which the AAA module 500 is embedded. The second CLR 504 and the third CLR 506 also include a GPS location for the second and third DMA that are coupled to the first DMA in which the AAA module 500 is embedded. Further, the second CLR 502 and the third CLR 504 include a neighborhood (NB) list to identify neighboring DMS that are located proximately to the DMA in which the AAA module 500 is embedded.

FIG. 5 further indicates the data associated with the HLR 502, the second CLR 504, the third CLR 506, and the VLR 508 include at least one international mobile subscriber identification (IMSI) 512 and at least one electronic series number (ESN) 514. Moreover, the HLR 502, the second CLR 504, and the third CLR 506 records also include at least one mobile directory number (MDN) 516. In a particular embodiment, the HLR 502 includes a location 518 for at least one mobile subscriber that is registered with the HLR 502.

As shown in FIG. 5, the HLR 502 and the VLR 508 further include at least one temporary location directory number (TLDN) 520, a registration indicator 522, a timer 524, a mobile switching center (MSC) preference indicator 526, an integrated services digital network (ISDN) preference indicator 528, and a voice over Internet protocol (VoIP) preference indicator 530 and a timer interval given to the visited mobile to be registered.

As shown in FIG. 5, the AAA module 500 can also include a DPR 530. As shown the DPR 530 includes at least one MDN prefix 532. Further, the DPR 530 includes a first preferred destination indicator 534, a second preferred destination indicator 536, and a third preferred destination indicator 538. In a particular embodiment, the preferred destination indicators 534, 536, 638 indicate a hierarchy of call paths that may be used to place calls outside a DMA network provided by one or more DMAs. For example, the first preferred destination indicator 534 can be a VoIP call path, the second preferred destination indicator 536 can be an ISDN call path, and the third destination indicator can be an MSC call path.

As such, in an illustrative embodiment, when a mobile subscriber attempts to call a particular MDN that is not within the HLR 502, the second CLR 504, or the third CLR 506, the AAA module 500 can match the prefix of the MDN to the at least one MDN prefix in order to determine a preferred call path destination for establishing a call outside of the DMA network provided by the DMA in which the AAA module 500 is embedded. Accordingly, if a user wishes to save money, the user can choose to make calls outside of the DMA network via a VoIP interface. In another example, if a user wishes to have a higher call quality, the user can choose to make calls outside of the DMA network via an ISDN interface.

Figure 6:
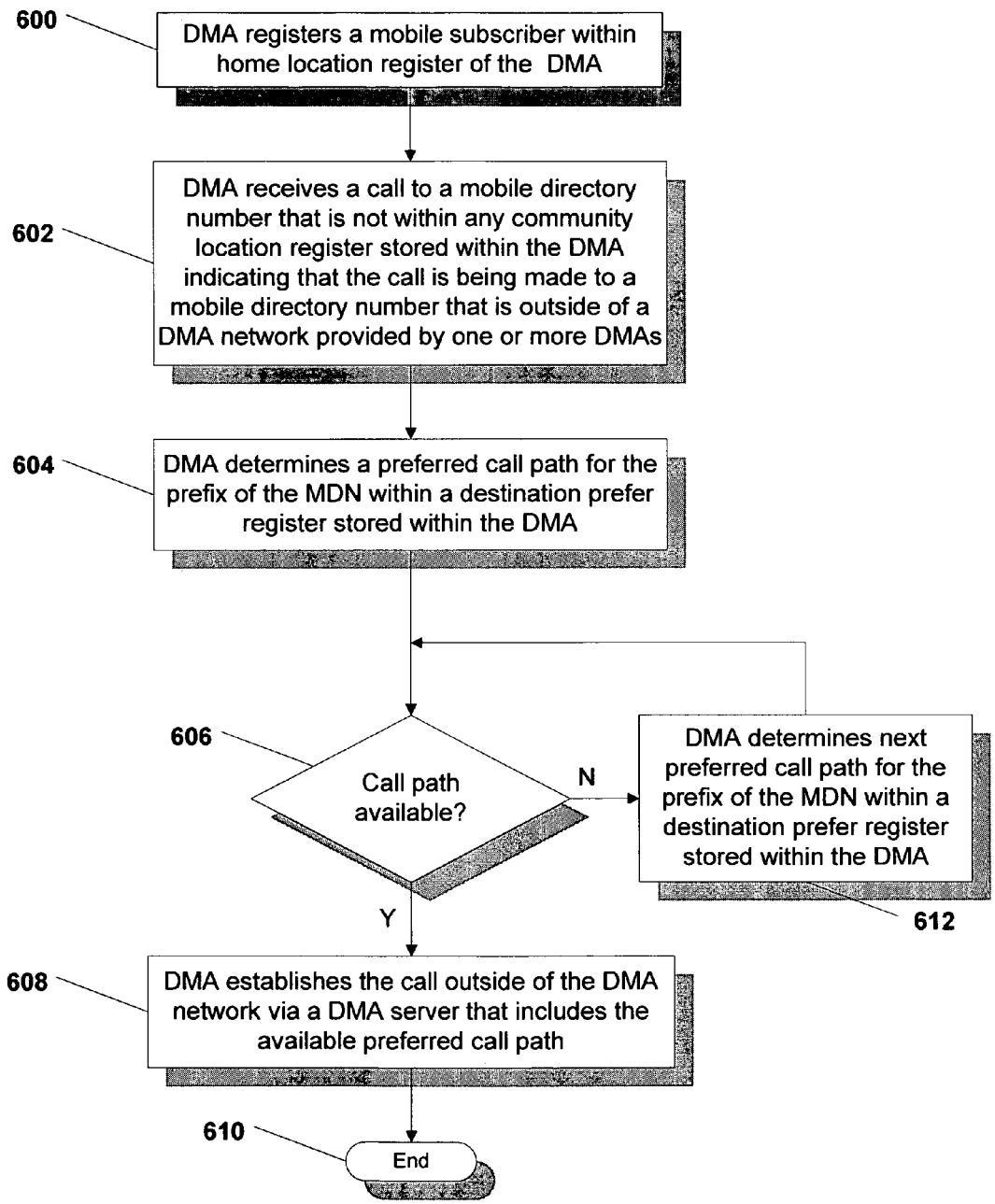
FIG. 6 is a flow chart to illustrate a method of determining a preferred call path for calls to be routed outside of a DMA network.

Referring to FIG. 6, a method of determining a preferred call path for calls to be routed outside of a DMA network is shown and commences at block 600. At block 600, a DMA registers a mobile subscriber within a home location register (HLR) of the DMA. At block 602, the DMA receives a call directed to a destination mobile directory number (MDN) that is not within any community location register (CLR) stored within the DMA. In a particular embodiment, this is an indication that the call is being made to a mobile directory number that is outside of a DMA network provided by one or more DMAs. Moving to block 604, the DMA determines a preferred call path based on the prefix of the MDN. In a particular embodiment, the DMA can match the prefix of the MDN with an MDN prefix within a destination preference register (DPR) stored within the DMA in order to determine a hierarchy of preferred call paths for routing the call to the MDN. In a particular embodiment, the MDN is a ten digit telephone number, e.g., 222-333-4444, and the prefix of the MDN can be the first three digits of the number, e.g., 222. Further, in a particular embodiment, the preferred call path can be placed over a VoIP interface, an ISDN interface, or an MSC interface.

Proceeding to block 606, the DMA determines whether an interface associated with a selected first preferred the call path is available. If so, the method continues to block 608 and the DMA establishes the call to the MDN outside of the DMA network via a DMA server that routes the call over the preferred call path. The method then ends at state 610. For example, with reference to FIG. 2, if the first subscriber 208 of the first DMA 202 includes a first preferred call path that is set to ISDN and the ISDN interface at the third DMA 206 is available, a call from the first subscriber 208 of the first DMA 202 to an external device can be routed to the third DMA 206. In turn, the third DMA 206 can route the external device via the ISDN interface 224.

Returning to decision step 606, if the first preferred call path is not available, the DMA determines the next preferred call path for the matching MDN prefix within the DPR. The method then returns to decision step 606 and continues as described herein. Again, with reference to FIG. 2, if the ISDN interface 224 is unavailable, a call to an external device can be routed to the first DMA 202, which can route the call to the external device via the MSC interface 220. Additionally, if the ISDN interface 224 and the MSC interface 220 is unavailable, a call to an external device can be routed to the second DMA 204, which can route the call to the external device via the VoIP interface. In a particular embodiment, if none of the preferred call paths are available, the DMA can indicate that the call cannot be connected.

Figure 7:
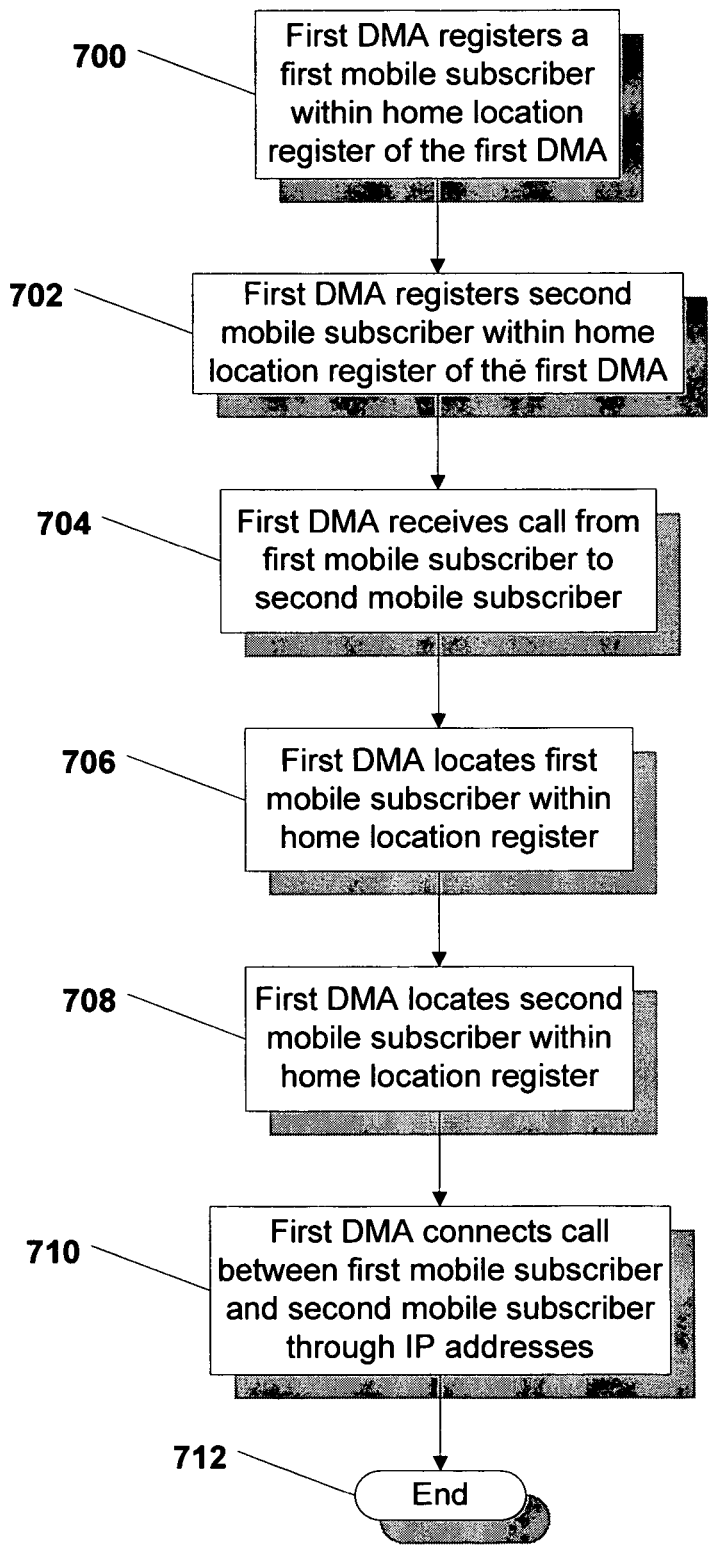
FIG. 7 is a flow chart to illustrate a method of providing a call between a first mobile subscriber and a second mobile subscriber via a single distributed mobile architecture.

Referring to FIG. 7, a method of establishing communication via a distributed mobile architecture (DMA) is shown and commences at block 700. At block 700, the DMA registers a first mobile subscriber within the home location register (HLR) of the DMA. Next, at block 702, the DMA registers a second mobile subscriber within the home location register (HLR) of the DMA. Moving to block 704, the DMA receives a call from the first mobile subscriber to the second mobile subscriber. At block 706, the DMA locates the first mobile subscriber within the home location register of the DMA. Next, at block 708, the DMA locates the second mobile subscriber within the home location register of the DMA. Proceeding to block 710, the DMA connects the call between the first mobile subscriber and the second mobile subscriber via one or more local IP addresses within the DMA. The method then ends at state 712.

Figure 8:
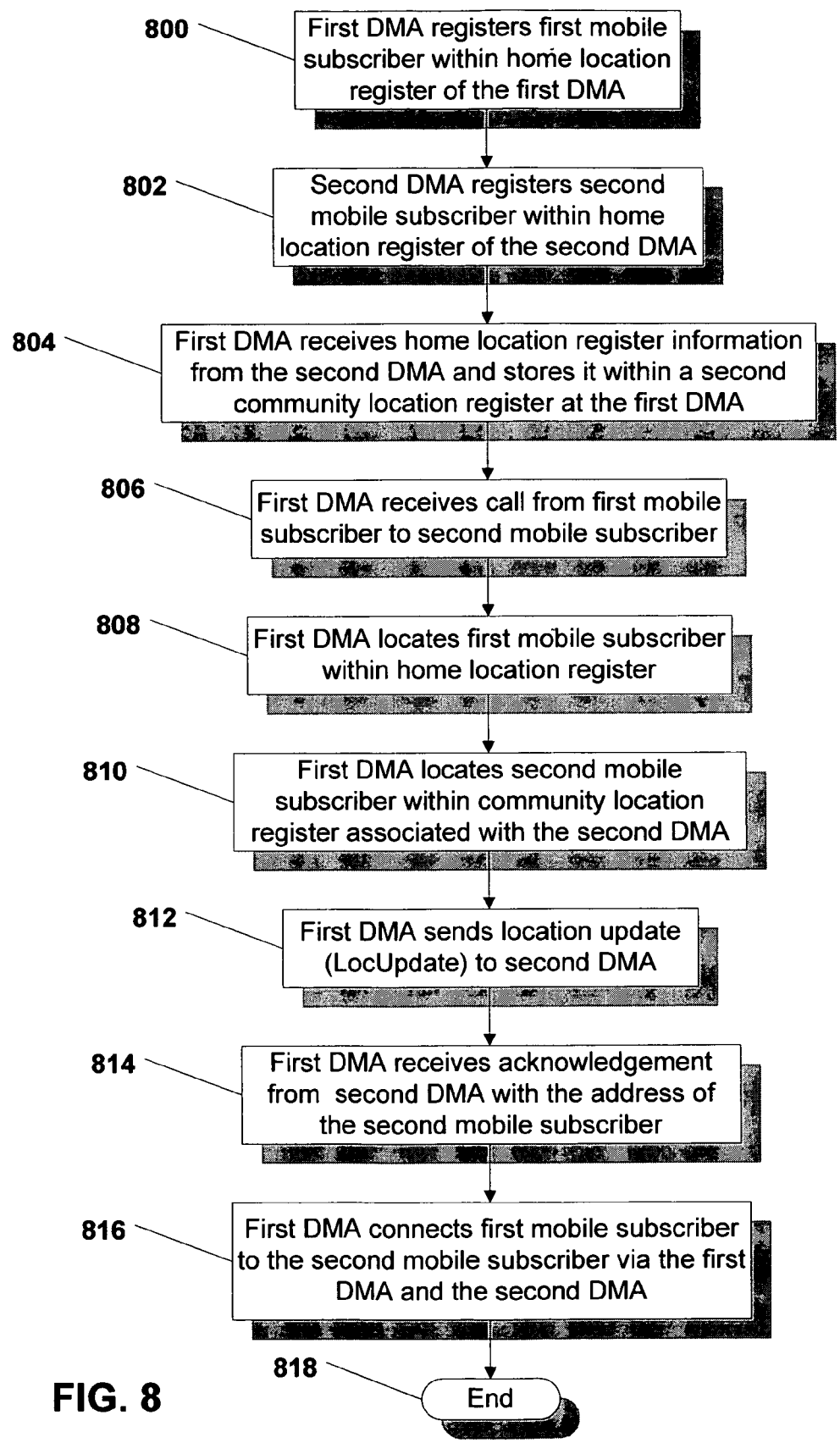
FIG. 8 is a flow chart to illustrate a method of providing a call between a first mobile subscriber and a second mobile subscriber via a first distributed mobile architecture and a second distributed mobile architecture.

FIG. 8 depicts a method of establishing communication via a first distributed mobile architecture (DMA) and a second DMA. Beginning at block 800, the first DMA registers a first mobile subscriber within a home location register (HLR) of the first DMA. At block 802, the second DMA registers a second mobile subscriber within the home location register (HLR) of the second DMA. Thereafter, at block 804, the first DMA pre-fetches the home location register (HLR) information from the second DMA and stores it within a second community location register (CLR) at the first DMA. In a particular embodiment, the first DMA and the second DMA can be linked to each other via an IP network.

Moving to block 806, the first DMA receives a call from the first mobile subscriber to be routed to the second mobile subscriber. At block 808, the first DMA locates the first mobile subscriber within the home location register (HLR) of the first DMA. Proceeding to block 810, the first DMA locates the second mobile subscriber within the second community location register (CLR) associated with the second DMA. At block 812, the first DMA sends a location update request (LocUpdate) to the second DMA. Next, at block 814, the first DMA receives an acknowledgement from the second DMA. In an illustrative embodiment, the acknowledgement includes the current address of the second mobile subscriber within the second DMA. Continuing to block 816, the first DMA connects the first mobile subscriber to the second mobile subscriber via the first DMA and the second DMA by assigning an IP address at both the first DMA and the second DMA. The method then ends at state 818.

Figure 9:
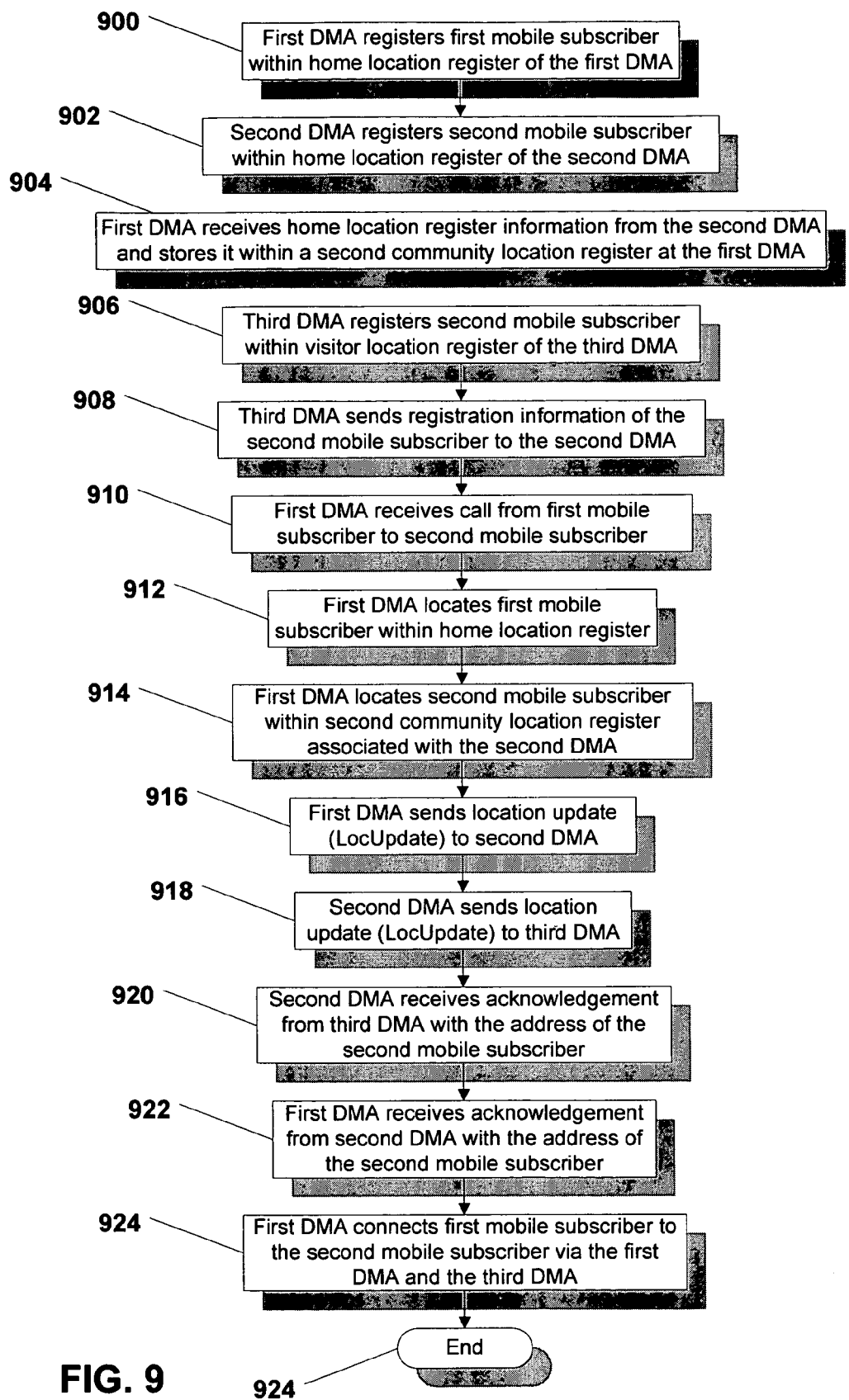
FIG. 9 is a flow chart to illustrate a method of providing a call between a first mobile subscriber and a roaming second mobile subscriber via a first distributed mobile architecture and a third distributed mobile architecture.

Referring to FIG. 9, a method of establishing communication between a first mobile subscriber and a second mobile subscriber that is roaming is shown and commences at block 900. At block 900, a first distributed mobile architecture (DMA) registers a first mobile subscriber within a home location register (HLR) of the first DMA. At block 902, a second DMA registers a second mobile subscriber within a home location register (HLR) of the second DMA. Moving to block 904, the first DMA receives the home location register (HLR) information from the second DMA and stores it within a second community location register (CLR) at the first DMA.

Proceeding to block 906, a third DMA registers the second mobile subscriber within a visitor location register (VLR) of the third DMA. In a particular embodiment, this indicates that the second mobile subscriber has roamed into a coverage area controlled by the third DMA. At block 908, the third DMA sends the registration information of the second mobile subscriber to the second DMA.

Moving to block 910, the first DMA receives a call from the first mobile subscriber to be routed to the second mobile subscriber. Thereafter, at block 912, the first DMA locates the first mobile subscriber within the home location register (HLR) of the first DMA. At block 914, the first DMA locates the second mobile subscriber within the second community location register (CLR) that is associated with the second DMA.

Proceeding to block 916, the first DMA sends a location update request (LocUpdate) to the second DMA. At block 918, the second DMA sends the location update (LocUpdate) to the third DMA. Then, at block 920, the second DMA receives an acknowledgement from the third DMA. In a particular embodiment, the acknowledgement includes a current address of the second mobile subscriber within the third DMA. For example, the third DMA can retrieve the current address of the second mobile subscriber from the VLR within the third DMA. Continuing to block 922, the first DMA receives the acknowledgement from the second DMA with the address of the second mobile subscriber. Next, at block 924, the first DMA connects the first mobile subscriber to the second mobile subscriber via the first DMA and the third DMA. For example, an IP address at the third DMA is assigned to the call and is used to route the call over an IP network between the first DMA and the third DMA. The method then ends at state 926.

Figure 10:
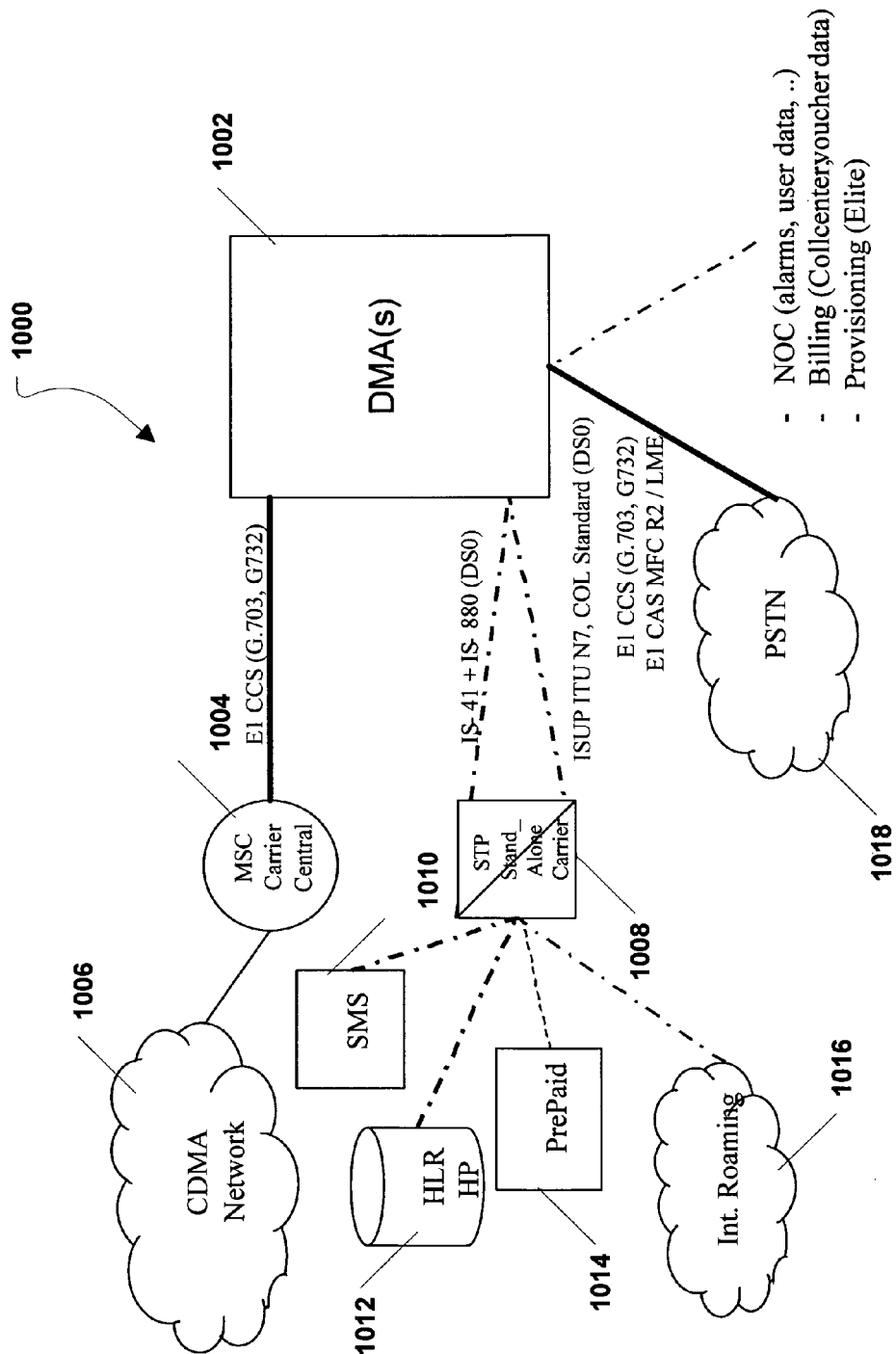
FIG. 10 is a diagram of an exemplary communication system in which a distributed management architecture server can be incorporated.

Referring to FIG. 10, an exemplary, non-limiting embodiment of a telecommunications system is shown and is generally designated 1000. As shown, the system includes one or more DMAs 1002 that are connected to a wireless carrier's central MSC 1004. The DMA(s) 1002 can be connected to the MSC 1004 via an E1 CCS (G.703, G732) connection, or any other applicable connection. The MSC 1004, in turn, is connected to a code division multiple access (CDMA) network 1006. FIG. 10 further shows that the DMA(s) 1002 can be connected to a switching transfer point (STP) 1008 of a stand-alone carrier. As shown, the DMA 1002 can be connected to the STP 1008 via an IS-41+IS-880 (DS0) connection, or an ISUP ITU N7 connection.

As further depicted in FIG. 10, the STP 1008 can be connected to a short messaging service (SMS) server 1010 in order to provide text-messaging capabilities for the mobile communication devices using the system 1000 shown in FIG. 10. Additionally, the STP 1008 can be connected to a home location register (HLR) 1012, a pre-paid wireless server 1014 and an international roaming network 1016 in order to provide pre-paid services and roaming between multiple countries. FIG. 10 shows that the DMA(s) 1002 can be connected to the PTSN 1018 via an E1 CCS (G.703, G732) connection, or any other appropriate connection.

Figure 11:
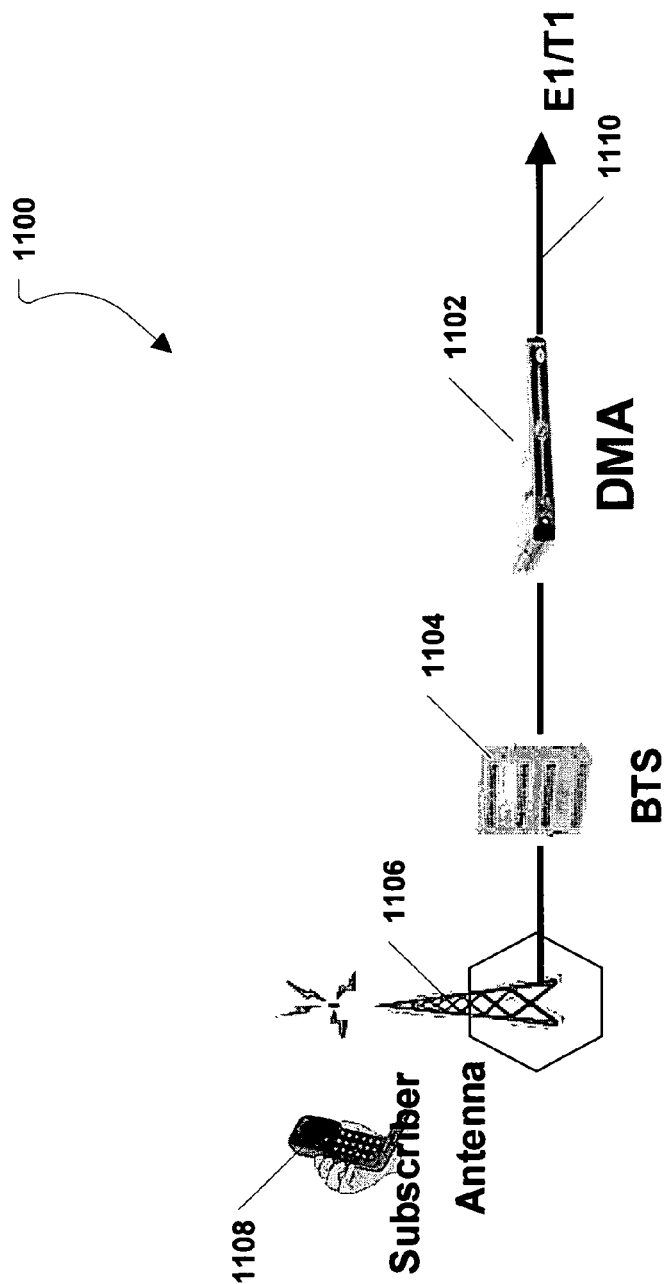
FIG. 11 is a diagram of a wireless local loop communication system in which a distributed management architecture server can be incorporated.

Referring to FIG. 11, a wireless local loop (WLL) system is portrayed and is generally designated 1100. As illustrated in FIG. 11, the system 1100 includes a DMA 1102 that is connected to a BTS 1104. The BTS 1104, in turn, is connected to an antenna 1106. The antenna 1106 provides cellular coverage for one or more subscribers 1108 within transmission distance of the antenna 1106. FIG. 11 indicates that the system 1100 can further include a data network connection 1110 from the DMA 1102. The data network connection 1110 can connect the DMA 1102 to the PSTN via an ISUP/ISDN signaling connection on an SS7 link set or a T1/E1 wireless connection. Further, the data network connection 1110 can be an IEEE 802.11 connection between the DMA 1102 depicted in FIG. 11 and other DMAs not shown. The DMA 1102 can beneficially utilize existing infrastructure used for cellular and SMS data services.

Figure 12:
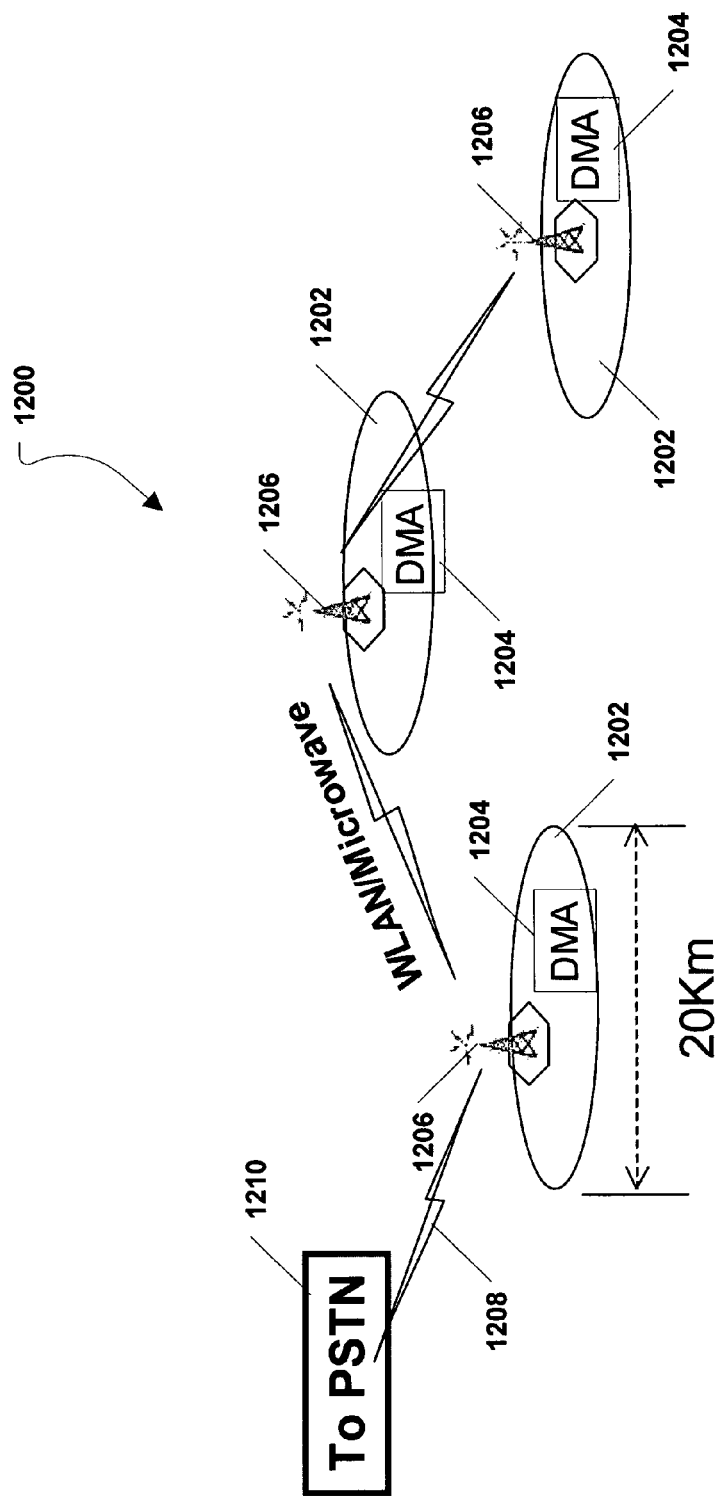
FIG. 12 is a diagram of plural wireless local loop communication systems connected to the public switched telephone network via a single back-haul connection.

FIG. 12 shows a multi-WLL system, generally designated 1200. As shown, the system 1200 includes a plurality of WLLs 1202. Each WLL 1202 can include a DMA 1204 and an antenna 1206 connected thereto to provide a cellular coverage site around the antenna 1206. As illustrated in FIG. 12, the WLLs 1202 can be interconnected via a wireless local area network (WLAN), or a wide area network, such as a microwave connection. Moreover, a DMA 1204 within one of the WLLs 1202 can provide a back-haul connection 1208 to the PSTN 1210. This type of deployment scenario can greatly reduce the costs associated with a wireless system. Since the DMAs 1204 are connected to each other via the WLAN or microwave connections, the relatively expensive inter-site back-haul component is removed. Further, using the hand-off logic, the DMAs 1204 can enable roaming between the WLLs 1202 and can further provide roaming to an external wireless or other network.

Figure 13:
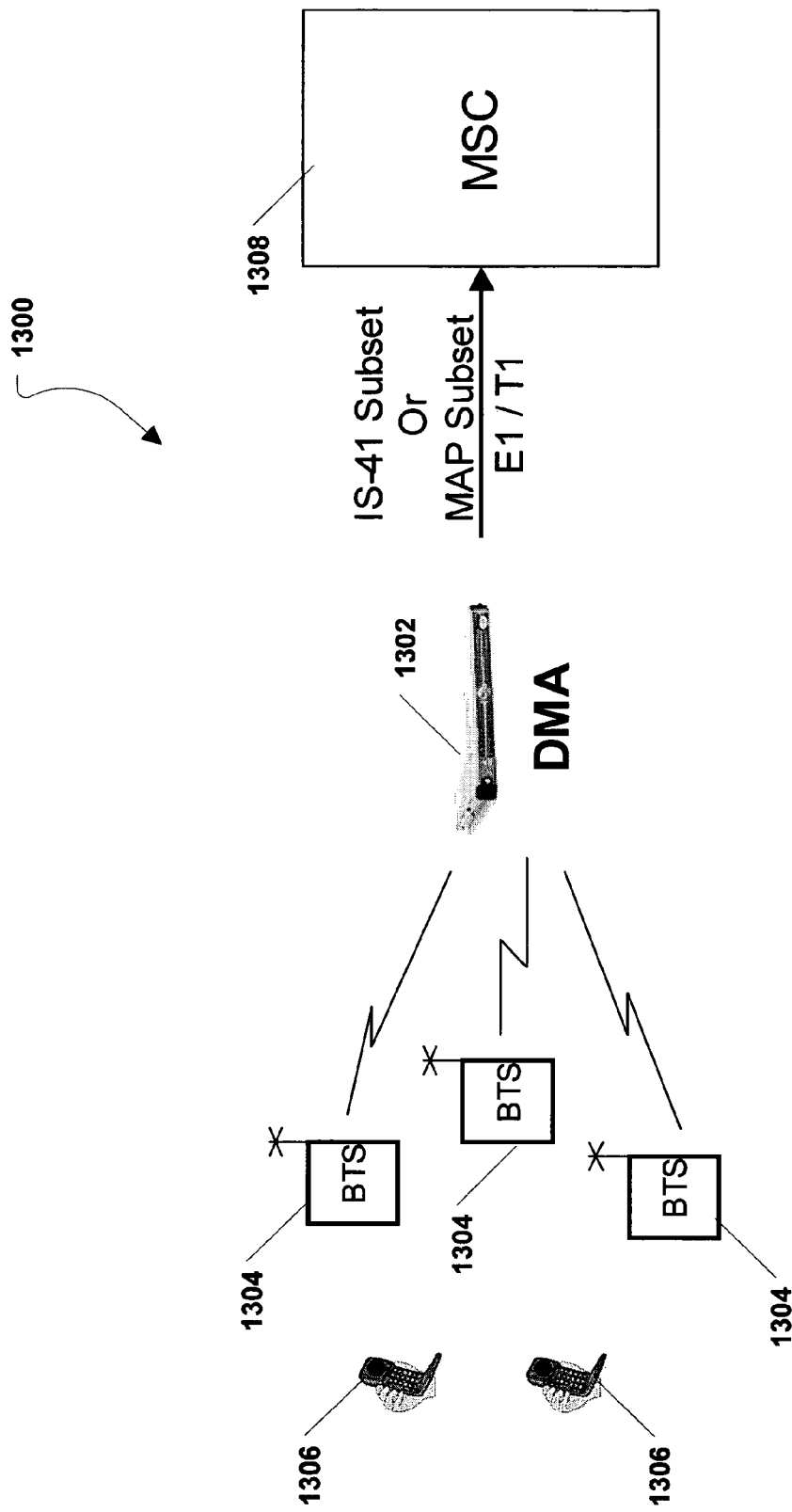
FIG. 13 is a diagram of a communication system in which a distributed management architecture server can be deployed to extend an existing cellular network.

Referring to FIG. 13, a telecommunications system is depicted and is designated 1300. As illustrated in FIG. 13, the system 1300 includes a DMA 1302 that can be connected to a plurality of BTSs 1304. Each BTS 1304 can provide cellular coverage for one or more mobile communication devices 1306, e.g., one or more mobile handsets configured to communicate via the DMA 1302. FIG. 13 further shows that the DMA 1302 can be connected to an MSC 1308, such as an MSC of an existing cellular system. The DMA 1302 can be connected to the MSC via an IS-41 subset or a MAP subset over a wireless E1/T1 connection. With this implementation, the DMA 1302 can extend an existing cellular network when connected to an existing cellular system MSC 1308.

Figure 14:
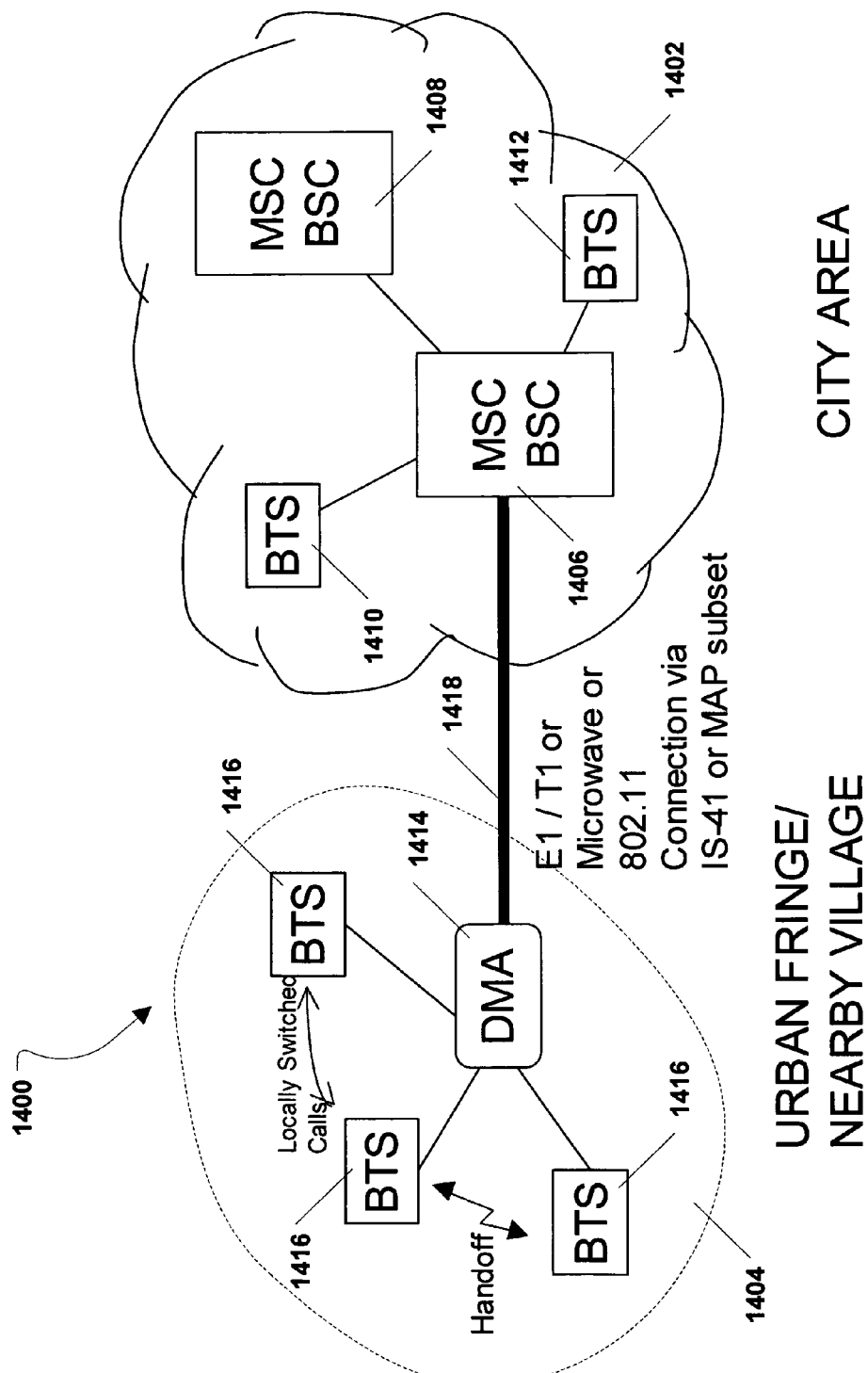
FIG. 14 is a diagram of a communication system in which a distributed management architecture server can be deployed to cover urban fringe around an existing network.

FIG. 14 shows an additional telecommunications system, generally designated 1400. As shown, the system 1400 includes a city area coverage site 1402 and an urban fringe/nearby village coverage site 1404. In an exemplary, non-limiting embodiment, the city area coverage site 1402 includes a first MSC/BSC center 1406 connected to a second MSC/BSC center 1408. Also, a first representative BTS 1410 and a second representative BTS 1412 are connected to the first MSC/BSC center 1406. The particular deployment of equipment is configured to provide adequate cellular coverage for mobile communication devices within the city area coverage site 1402.

As illustrated in FIG. 14, the urban fringe/nearby village coverage site 1404 includes a DMA 1414 having a plurality of BTSs 1416 connected thereto. The DMA 1414 can provide hand-off of calls between the BTSs 1416 and can switch calls made between the BTSs 1416 locally. However, the DMA 1414 within the urban fringe/nearby village coverage site 1404 can also connect telephony traffic to the first MSC/BSC center 1406 within the city area coverage site 1402 via a data network connection 1418. In one embodiment, the data network connection can be an E1 connection, a T1 connection, a microwave connection, or an 802.11 connection established via an IS-41 subset or MAP subset. The deployment of a DMA 1414 in a location such as that described above, i.e., in urban fringe or in a nearby village, and the connection of the DMA 1414 to an MSC/BSC center 1406 in a city area, can provide service to potential wireless customers that typically would not receive cellular coverage from the city area cellular coverage site 1402. Thus, new subscribers receive access to wireless communication service and can further communicate with wireless customers within the city area cellular coverage site 1402.

Referring now to FIG. 15, another telecommunications system is depicted and is designated 1500. As illustrated in FIG. 15, the system 1500 includes a DMA 1502 that can be connected to a plurality of BTSs 1504. Each BTS 1504 can provide cellular coverage for one or more mobile communication devices 1506. FIG. 15 further shows that the DMA 1502 can include a data network connection 1508 that provides a back-haul connection to the PSTN 1510. In one embodiment, the data network connection can be an E1 connection, a T1 connection, a cable connection, a microwave connection, or a satellite connection. Moreover, the system 1500 depicted in FIG. 15 can be deployed using CDMA IS-95, CDMA 1X, GSM/GPRS, W-CDMA, or other industry standard technologies.

Using a single back-haul connection greatly minimizes costs associated with the wireless communication network. Further, the system 1500 shown in FIG. 15 can be deployed relatively rapidly and can be maintained remotely. Additionally, with the inclusion of the OAMP module 540 (FIG. 5) and the AAA module 528 (FIG. 5), subscriber accounts can be managed locally and billing can be performed locally, i.e., within the DMA 1502. Moreover, as the number of subscribers increase, the size of the system can be increased modularly, e.g., by adding DMAs, corresponding BTSs, and the appropriate connections.

Figure 16:
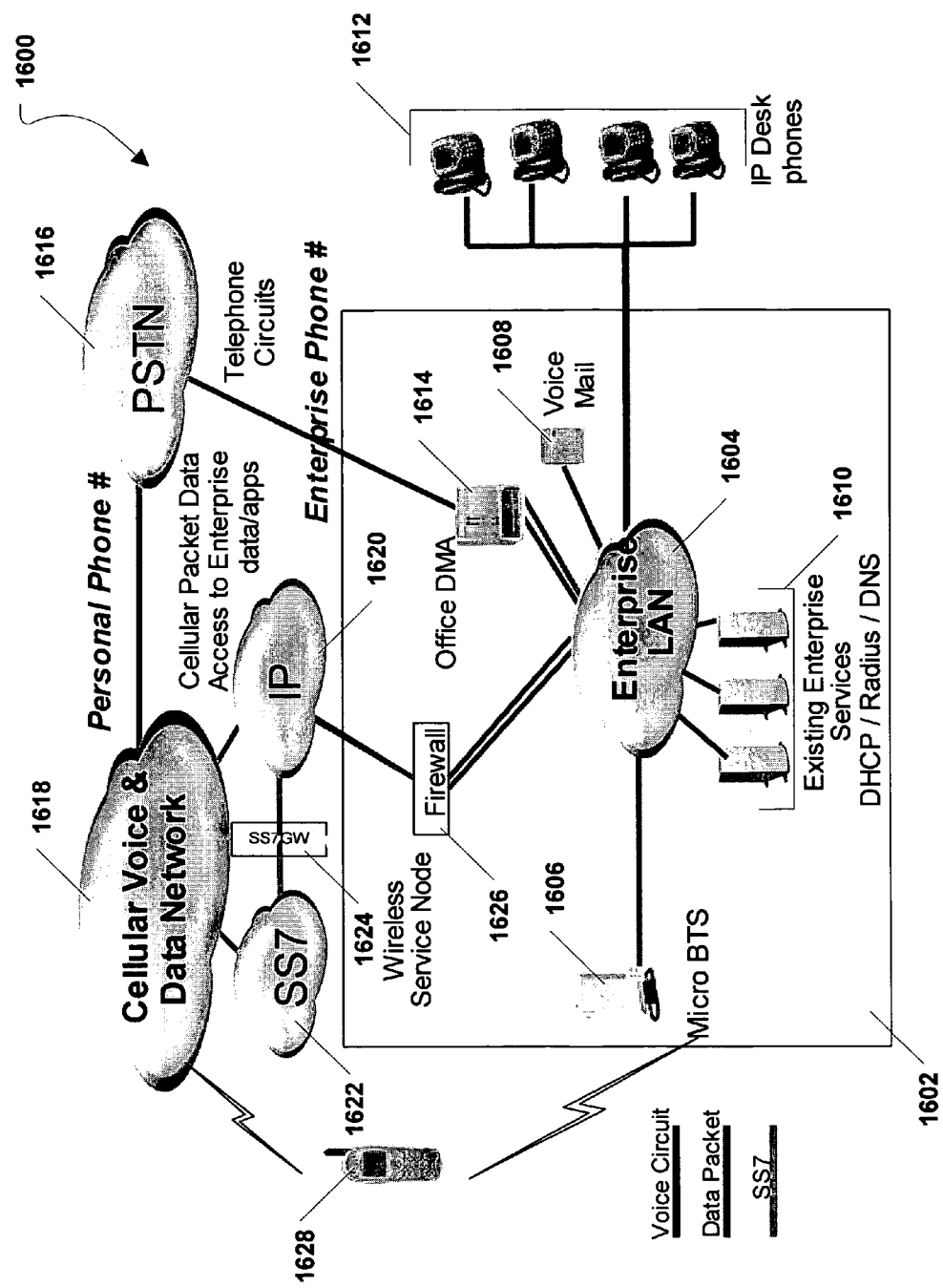
FIG. 16 is a diagram of an in-building communication system in which a distributed management architecture server can be deployed.

FIG. 16 illustrates an in-building telecommunications network that is generally designated 1600. FIG. 16 depicts a structure 1602, e.g., an office building, a commercial building, a house, etc. An enterprise local area network (LAN) 1604 is installed within the building 1602. A micro-BTS 1606 is connected to the enterprise LAN 1604. Moreover, a voice mail server 1608 and plural enterprise services servers 1610 are connected to the enterprise LAN 1604. In an exemplary, non-limiting embodiment, the enterprise services servers 1610 can include a dynamic host configuration protocol (DHCP) server, a radius server, a domain name server (DNS), etc. As depicted in FIG. 16, a plurality of phones 1612, e.g., IP desk phones can be connected to the enterprise LAN 1604.

FIG. 16 further indicates that an office DMA 1614 can be connected to the enterprise LAN 1604. The office DMA 1614 can also be connected to the PSTN 1616, which, in turn, can be connected to a cellular voice and data network 1618. The enterprise LAN 1604 can also be connected to the cellular voice and data network 1618 via an Internet protocol (IP) network 1620. A signaling system seven (SS7) network 1622 can be connected to the cellular voice and data network 1618 and the IP network 1620. FIG. 16 also depicts an SS7 gateway 1624 between the SS7 network 1622 and the IP network 1620 and a firewall 1626 between the enterprise LAN 1604 and the IP network 1620. FIG. 16 shows a wireless communication device 1628 in communication with the cellular voice and data network 1618 and the micro-BTS 1606.

Figure 17:
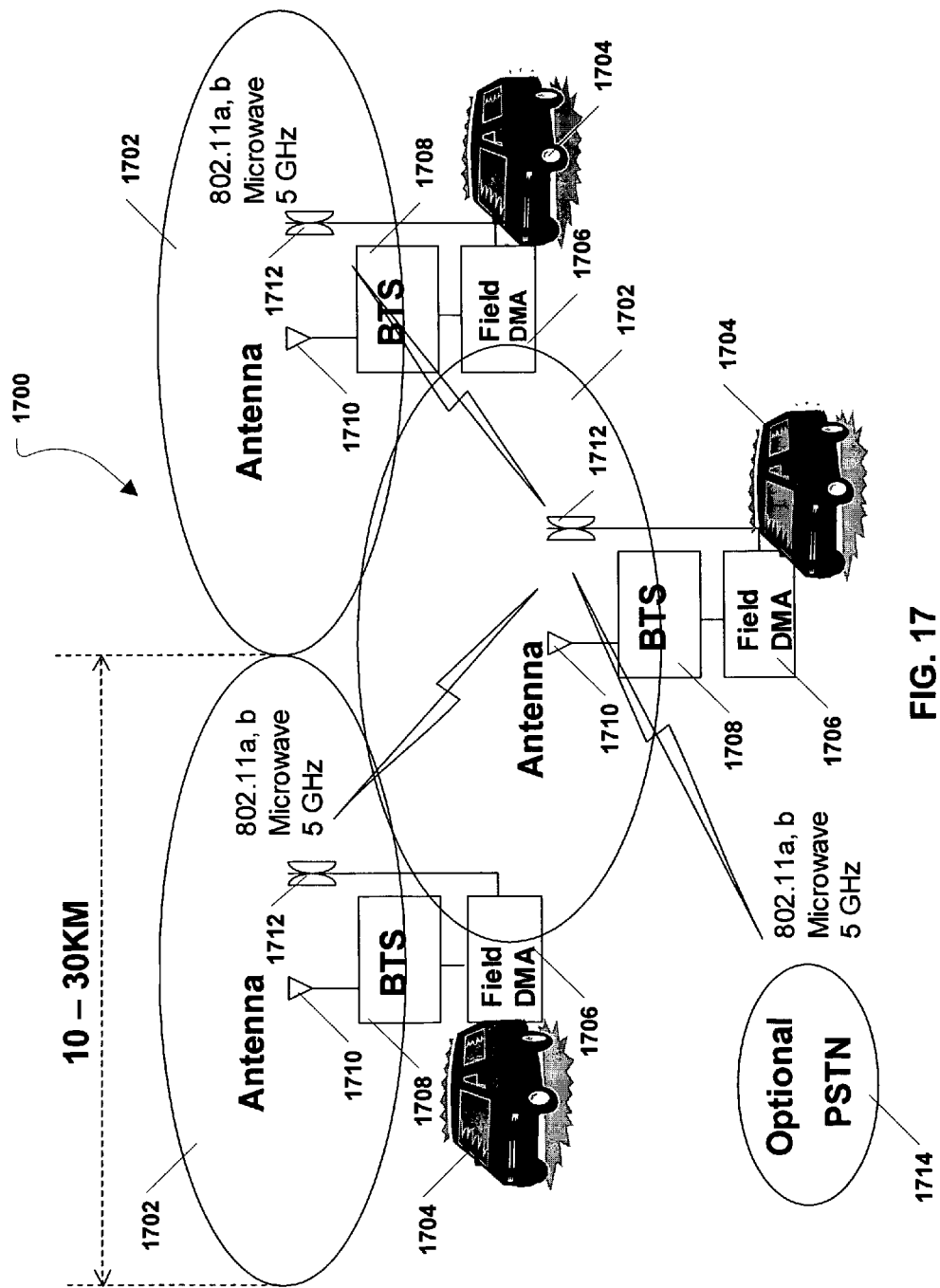
FIG. 17 is a diagram of a mobile in-field communication system in which multiple distributed management architecture servers can be deployed via multiple vehicles.

Referring to FIG. 17, a mobile in-field telecommunications system is depicted and is generally designated 1700. As depicted, the system 1700 includes a plurality of mobile cellular coverage sites 1702. Each mobile cellular coverage site 1702 includes a vehicle 1704 in which a field DMA 1706 is disposed. Moreover, a BTS 1708 is disposed within each vehicle 1704 and is in direct physical connection with the field DMA 1706, e.g., by a wire or cable connected therebetween. The field DMA 1706 and the BTS 1708 can be removably installed within the vehicle 1704 or permanently affixed therein. FIG. 17 further indicates that each BTS 1708 can include an antenna 1710 that is designed to communicate with mobile communication devices. Also, each field DMA 1706 includes an antenna 1712. In an exemplary, non-limiting embodiment, the field DMAs 1706 can communicate wirelessly with each other via the antennae 1712, e.g., via 802.11a, 802.11b, microwaves, or other wireless link.

The mobile cellular coverage sites 1702 can be deployed to provide a temporary web of cellular coverage for a plurality of mobile communication devices, e.g., devices carried by soldiers during a battle. The mobile in-field communications system 1700 can be recalled, moved, and re-deployed as necessary. Further, the system can include a wireless connection, e.g., 802.11a, 802.11b, microwaves, to the PSTN 1714.

Figure 18:
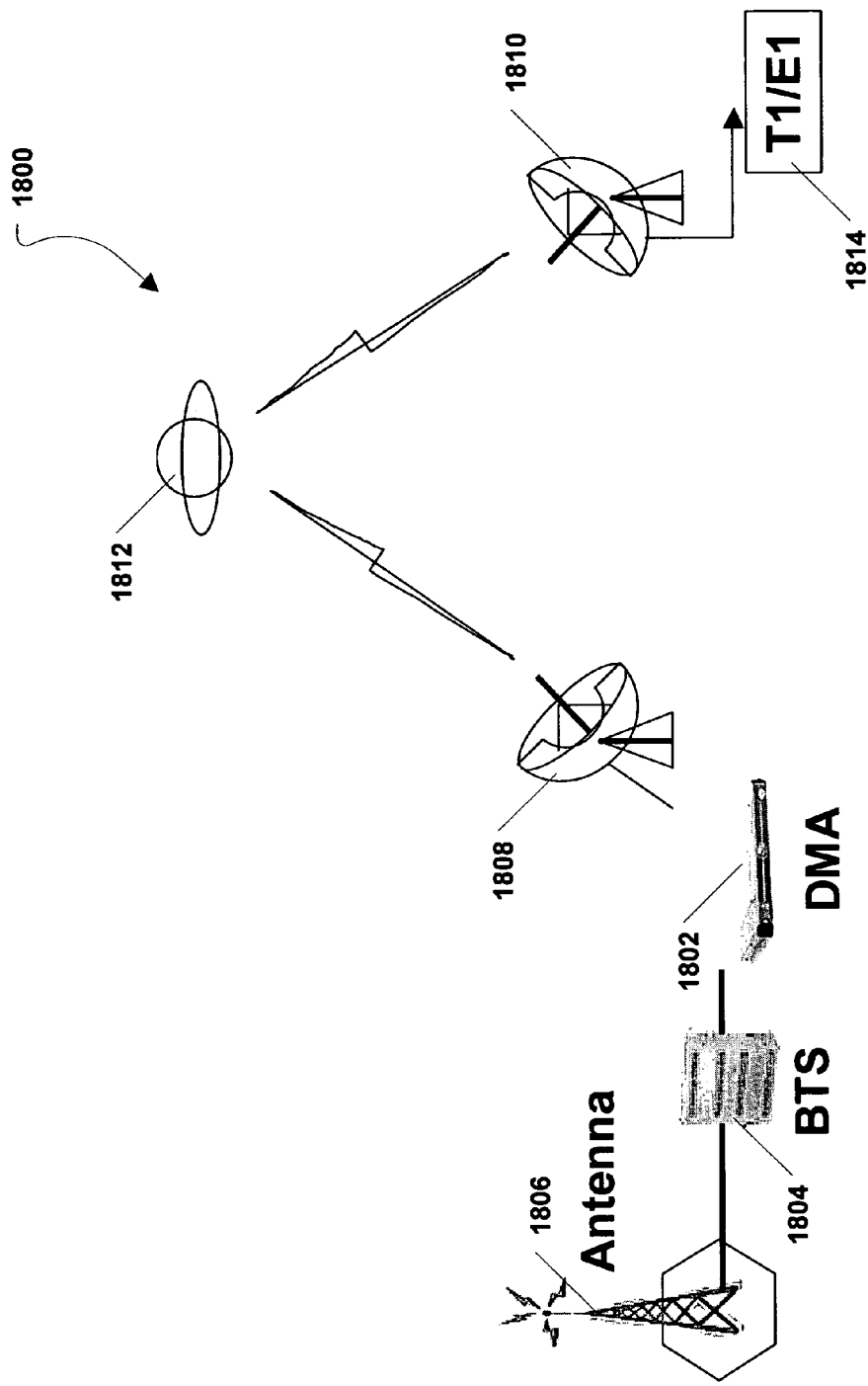
FIG. 18 is a diagram of a communication system in which a distributed management architecture server can utilize a satellite connection as a backhaul connection.

Referring to FIG. 18, still another telecommunications system is illustrated and is generally designated 1800. As depicted in FIG. 18, the system 1800 includes a DMA 1802 that is connected to a BTS 1804. The BTS 1804, in turn, is connected to an antenna 1806. FIG. 18 further illustrates that a first satellite transceiver 1808 is also connected to the DMA 1802. The first satellite transceiver 1808 communicates with a second satellite transceiver 1810 via a satellite 1812. Additionally, the second satellite transceiver 1810 includes a data network connection 1814, e.g., a T1 connection, or an E1 connection. The satellite transceivers 1808, 1810 and the satellite 1812 can provide a backhaul connection for the DMA 1802. Or, the satellite transceivers 1808, 1810 and the satellite 1812 can connect the DMA 1802 to an additional DMA (not shown).

Figure 19:
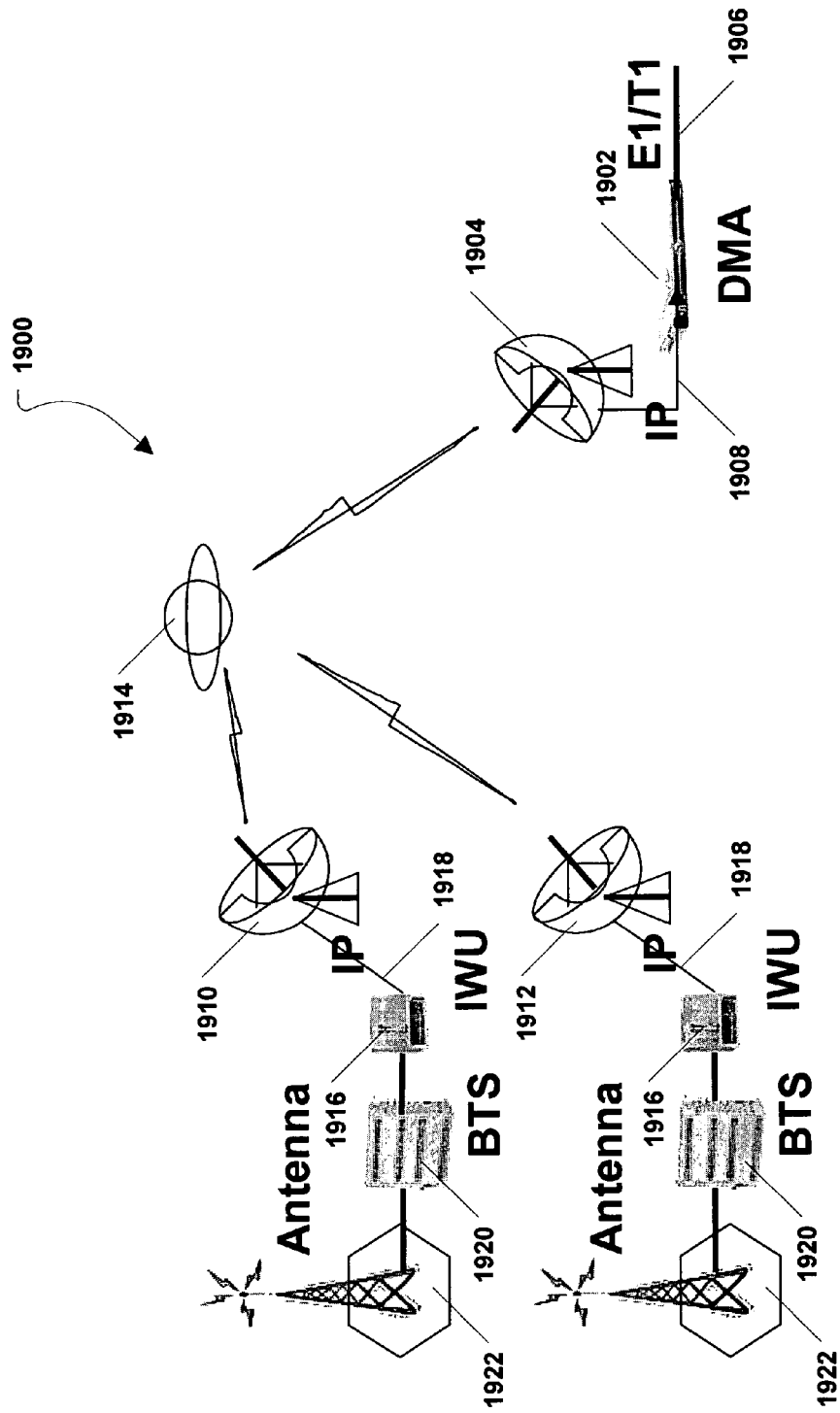
FIG. 19 is a diagram of a communication system in which a distributed management architecture server can receive multiple backhaul signals via multiple satellite signals.

FIG. 19 shows yet another telecommunications system that is generally designated 1900. As illustrated in FIG. 19, the system includes a DMA 1902 that is connected to a first satellite transceiver 1904. Moreover, the DMA 1902 includes a primary network connection 1906, e.g., a T1 connection, or an E1 connection, and a secondary network connection 1908, e.g., an IP connection. FIG. 19 shows that the first satellite transceiver 1904 communicates with a second satellite transceiver 1910 and a third satellite transceiver 1912 via a satellite 1914. Each of the second and third satellite transceivers 1910, 1912 is connected to an interworking unit (IWU) 1916 via a data network connection 1918, e.g., an IP connection. Each IWU 1916 is connected to a BTS 1920, which in turn, is connected to an antenna 1922. The satellite transceivers 1904, 1910, 1912 provide an IP network extension for the DMA 1902. Moreover, in the deployment illustrated in FIG. 19, the DMA 1902 can act as a centralized micro-switch for handling calls received at the antennas 1922 and transmitted via the second and third satellite transceivers 1910, 1912.

Figure 20:
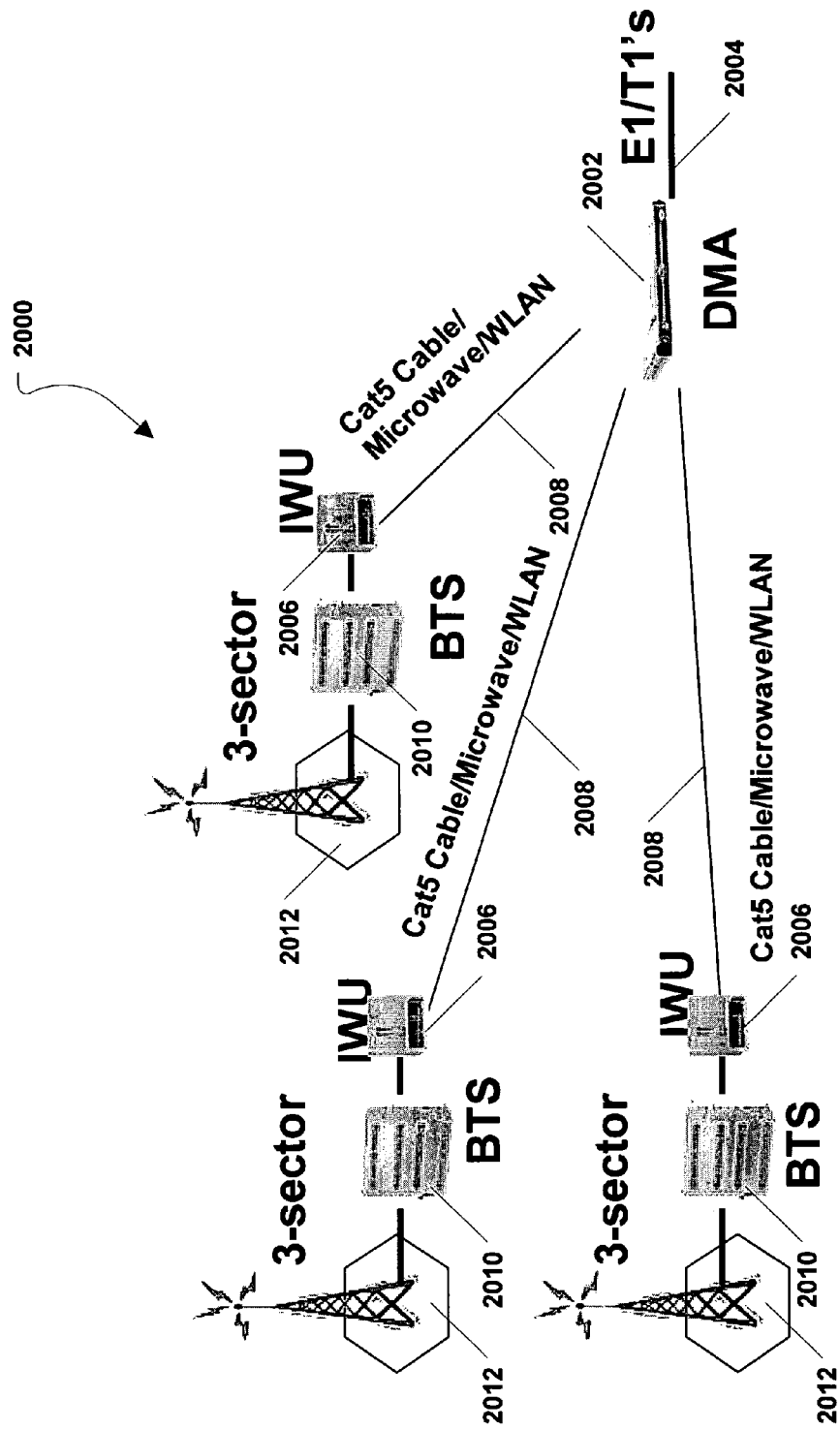
FIG. 20 is a diagram of a communication system in which a single distributed management architecture server can be connected to multiple base transceiver stations.

Referring to FIG. 20, another telecommunications system is depicted and is designated 2000. As shown, the system 2000 includes a DMA 2002 having a primary network connection 2004. Moreover, the DMA 2002 can be connected to a plurality of IWUs 2006. In an exemplary, non-limiting embodiment, the DMA 2002 can be connected to each IWU 2006 via a secondary network connection 2008, such as a category five (Cat 5) cable connection, a microwave connection, or a WLAN connection. Further, each IWU 2006 is connected to a BTS 2010 and each BTS 2010, in turn, is connected to an antenna 2012. Each BTS 2010 can be a 3-sector BTS. In the deployment depicted in FIG. 20, the DMA 2002 can act as a centralized micro-switch that can be used to handle telephony traffic received at the antennae 2012.

Figure 21:
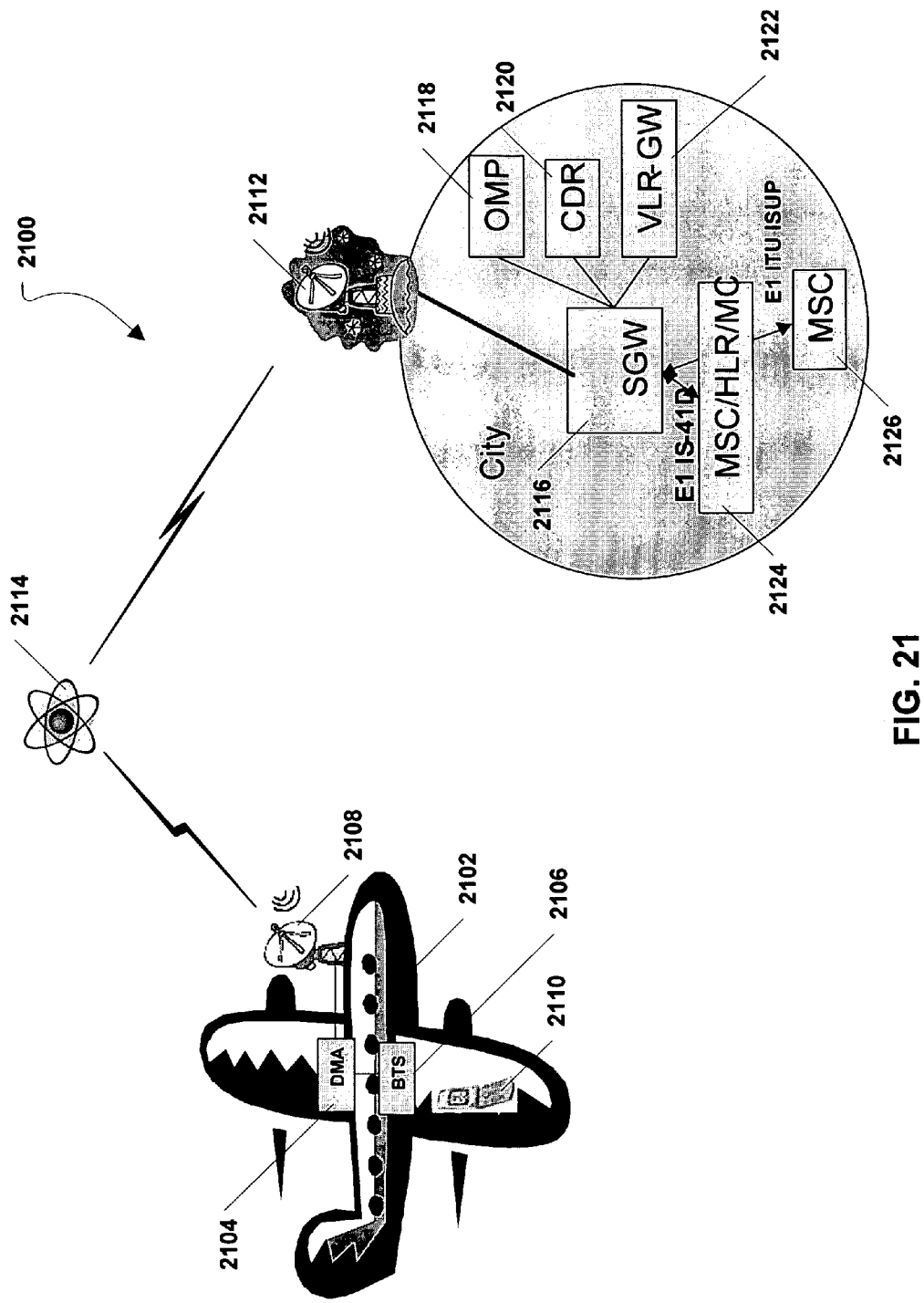
FIG. 21 is a diagram of a mobile communication system in which a distributed management architecture server can be deployed via an airplanes.

FIG. 21 illustrates yet another embodiment of a communications system, designated 2100. As shown, the system 2100 includes an airplane 2102 in which a DMA 2104 is installed. As shown, the DMA 2104 is coupled to a BTS 2106 and a first satellite transceiver 2108. FIG. 21 also shows a mobile communication device 2110 within the airplane 2102. The mobile communication device 2110 can be in wireless communication with the BTS 2106.

In a particular embodiment, the first satellite transceiver 2108 can communicate with a second satellite transceiver 2112 via a satellite 2114. As shown, the second satellite transceiver 2112 can be connected to a terrestrial server gateway 2116, e.g. a DMA gateway, that can provide connectivity to an operations and management platform (OMP) 2118, a call detail record (CDR) 2120, and a visitor location register gateway (VLR-GW) 2122. The OMP 2118, the CDR 212, and the VRL-GW 2122 can be separate from or incorporated within the server gateway 2116. FIG. 21 further shows that the server gateway 2116 can be connected to a first mobile switching center (MSC) 2124 that is coupled to a second MSC 2126.

Accordingly, the system 2100 shown in FIG. 21 can allow a user in the airplane 2102 to communicate with a ground based telephone. For example, the mobile communication device 2110 can communicate with the BTS 2106, which, in turn, can communicate with the first satellite transceiver 2108 via the DMA 2104. Further, the first satellite transceiver 2108 can transmit the call to a ground based communication system via the second satellite transceiver 2112 and the satellite 2114.

FIG. 21 shows a single airplane, however, multiple airplanes can be configured as described herein to provide communication from multiple airplanes to ground based telephones. Further, airplane-to-airplane communication can be provided. Additionally, the system 2100 can include other airborne vehicles, e.g., blimps.

Figure 22:
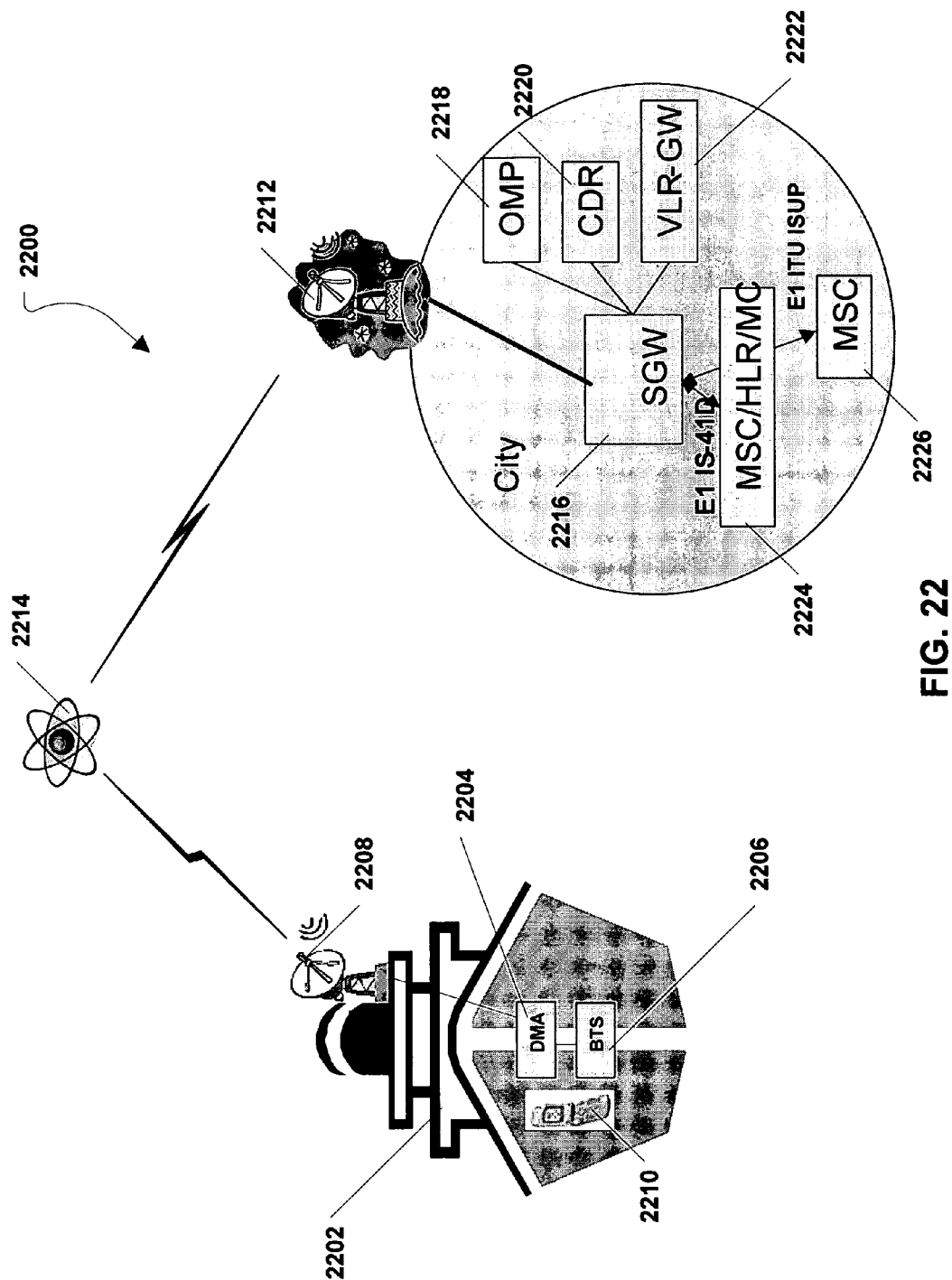
FIG. 22 is a diagram of a mobile communication system in which a distributed management architecture server can be deployed via a ship.

FIG. 22 illustrates yet another embodiment of a communications system, designated 2200. As shown, the system 2200 includes a ship 2202 in which a DMA 2204 is installed. As shown, the DMA 2204 is coupled to a BTS 2206 and a first satellite transceiver 2208. FIG. 22 also shows a mobile communication device 2210 within the ship 2202. The mobile communication device 2210 can be in wireless communication with the BTS 2206.

In a particular embodiment, the first satellite transceiver 2208 can communicate with a second satellite transceiver 2212 via a satellite 2214. As shown, the second satellite transceiver 2212 can be connected to a terrestrial server gateway 2216, e.g. a DMA gateway, that can provide connectivity to an operations and management platform (OMP) 2218, a call detail record (CDR) 2220, and a visitor location register gateway (VLR-GW) 2222. The OMP 2218, the CDR 222, and the VRL-GW 2222 can be separate from or incorporated within the server gateway 2216. FIG. 22 further shows that the server gateway 2216 can be connected to a first mobile switching center (MSC) 2224 that is coupled to a second MSC 2226.

Accordingly, the system shown in FIG. 2200 can allow a user within the ship 2202 to communicate with a ground-based telephone. For example, the mobile communication device 2210 can communicate with the BTS 2206, which, in turn, can communicate with the first satellite transceiver 2208 via the DMA 2204. Further, the first satellite transceiver 2208 can transmit the call to a ground based communication system via the second satellite transceiver 2212 and the satellite 2214.

FIG. 22 shows a single ship, however, multiple ships can be configured as described herein to provide communication from multiple ships to ground based telephones. Further, ship-to-ship communication can be provided. Additionally, the system 2200 can include other waterborne vehicles.

Figure 23:
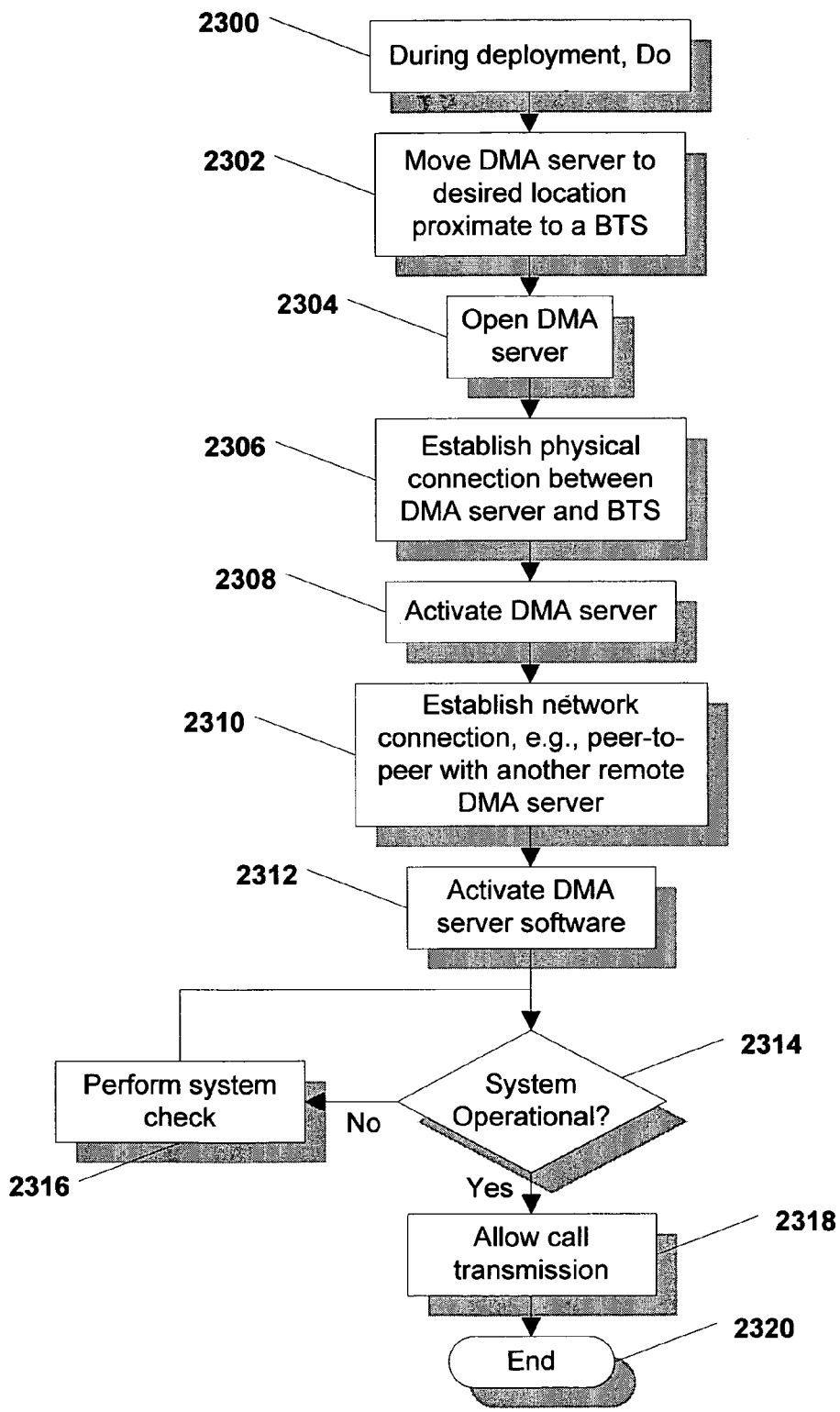
FIG. 23 is a flow chart to illustrate a method of deploying a distributed management architecture server.

Referring to FIG. 23, a method of deploying a distributed management architecture server is shown and commences at block 2300 wherein during deployment, the succeeding steps are performed. At block 2302, the DMA is moved to a desired location proximate to a BTS. Moving to block 2304, the DMA is opened. For example, if the DMA is the DMA shown in FIG. 1, the latch is unlocked and the lid is rotated about the hinges into the open position. Proceeding to block 2306, a physical connection is established between the DMA and the BTS, e.g., the BTS is coupled to the DMA via a wire.

Continuing to block 2308, the DMA is activated, e.g., powered on. At block 2310, a network connection is established with another remote DMA. In a particular embodiment, the network connection is a peer-to-peer connection between the DMAs. Moving to block 2312, DMA software within the DMA is activated. Thereafter, at decision step 2314, it is determined whether the system is operational. That decision can be a performed by the DMA, e.g., by a self-diagnostic routine or module within the DMA. Alternatively, that decision can be determined manually by a technician. If the system is not operational, a system check is performed at block 2316. In a particular embodiment, the system check performed at block 2316 is performed by a self-diagnostic routine or module within the DMA. On the other hand, a technician can perform the system check. After the system check, the logic then returns to decision step 2314 and continues as described herein. At decision step 2314, if the system is operational, the method proceeds to block 2318 and call transmission is allowed. The method then ends at state 2320.

Figure 24:
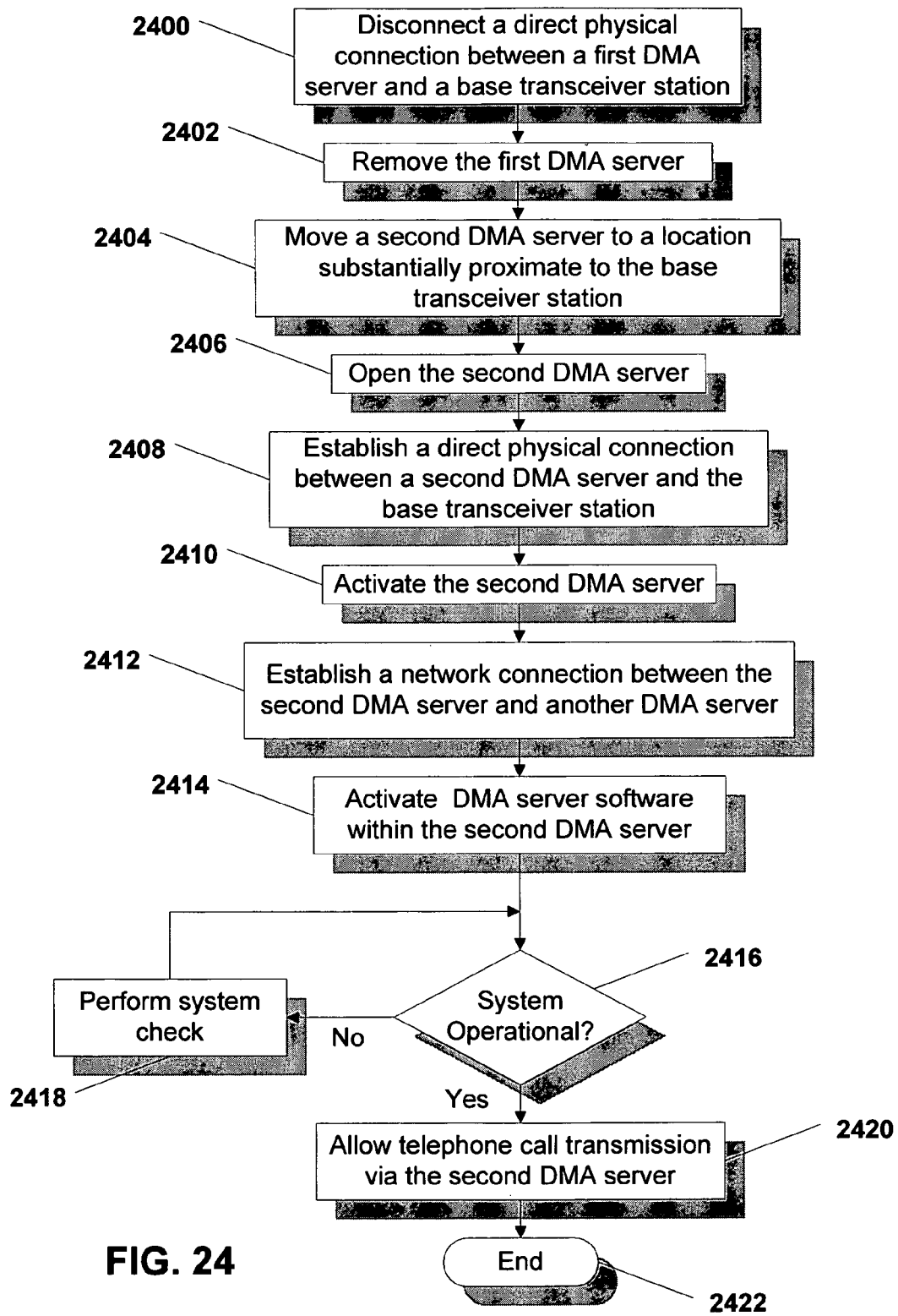
FIG. 24 is a flow chart to illustrate a method of replacing a distributed management architecture server.

Referring to FIG. 24, a method of deploying a distributed management architecture server is shown and commences at block 2400 wherein a direct physical connection between a first DMA and a base transceiver station is disconnected. At block 2402, the first DMA is removed. Proceeding to block 2404, a second DMA is moved to a location that is substantially proximate to the base transceiver station. At block 2406, the second DMA is opened. For example, if the DMA is the DMA shown in FIG. 1, the latch is unlocked and the lid is rotated about the hinges into the open position. Next, at block 2408, a direct physical connection is established between the second DMA and the base transceiver station.

Continuing to block 2410, the second DMA is activated. At block 2412, a network connection is established between the second DMA and another remote DMA. In a particular embodiment, the network connection is a peer-to-peer IP connection between the DMAs. Further, in a particular embodiment, the peer-to-peer connection is established via a private IP network. At block 2414, DMA software within the second DMA is activated.

Proceeding to decision step 2416, it is determined whether the system is operational. That decision can be a performed by the second DMA, e.g., by a self-diagnostic routine or module within the second DMA. Alternatively, the decision can be determined manually by a technician. If the system is not operational, a system check is performed at block 2418. In a particular embodiment, the system check performed at block 2418 is performed by a self-diagnostic routine or module within the second DMA. On the other hand, a technician can perform the system check. After the system check, the logic then returns to decision step 2416 and continues as described herein. At decision step 2416, if the system is operational, the method proceeds to block 2420 and call transmission is allowed via the second DMA. The method then ends at state 2422.

With the configuration of structure described above, the present disclosure provides a flexible telecommunications device, i.e., a DMA, that is distributive and associative, i.e., it can operate stand-alone or seamlessly within an existing cellular or other network. Moreover, the DMA can be integrated with virtually any third party base station. The DMA can operate with multiple air interfaces including CDMA IS-95, CDMA 1X, CDMA EVDO, GSM, GPRS, W-CDMA, 802.11 (Wi-fi), 802.16 (Wi-fi), etc. Further, the DMA can provide integrated prepaid billing, OAMP, network management, and AAA functionality. The DMA can include a Java based user interface and feature configuration system. Also, the DMA can provide real time call metering, call detail record (CDR) generation, and real time call provisioning. The DMA may be implemented in a relatively small footprint and has a relatively low power requirement. Further, the DMA may be implemented using inexpensive and widely available computer equipment.

With one or more of the deployment configurations described above, the present system provides mobile to landline calls from mobile handsets within a DMA cellular coverage area. Also, mobile to landline calls can be made from mobile handsets roaming into DMA coverage areas. Mobile to mobile calls can be made from home/roaming handsets to DMA handsets and vice versa. Further, mobile to IP calls and IP to mobile calls can be made from within a DMA coverage area. IP to IP calls can be made from any DMA handset to any IP phone. Additionally, IP to landline calls and landline to IP calls can be made from a DMA handset to any phone. Further, land-line to mobile calls to DMA handsets can be made.

The systems described above can support call forwarding, call waiting, 3-way calling caller ID, voice mail, and mobile to mobile SMS service, i.e., text messaging. Further, the systems described above can provide broadcast SMS service, mobile to land high-speed IP data (1X or GPRS) service and mobile-to-mobile high speed IP data (1X or GPRS) service. Also, the systems described above can provide IP-PBX capability.

Further, one or more of the illustrated systems can provide IP transport between distributed elements, e.g., DMAs. Packet back-haul from BTS to RAN can be provided. Further, the control logic within the DMAs can be distributed and associated. Associated systems can be redundant, self-healing, self-organizing, and scalable. Distributed systems can be "snap-together," i.e., a DMA can be linked to a previously deployed DMA in order to broaden, or otherwise extend, cellular coverage. Further, distributed systems can be de-centralized to avoid single points of failure.

One or more of the systems described above can also provide soft and softer call handoffs on the same frequency interfaces. Also, soft handoffs can be provided on different systems. Further, a DMA based system can operate stand-alone with a billing system provided by a DMA and CDR generation. Or, a system can use the SS7 network to pass CDRs to a central switch for integrated billing and operation with an existing network.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving, at a first distributed mobile architecture (DMA) system of a DMA network, a call from a first mobile subscriber to a second mobile subscriber, wherein the DMA network includes at least the first DMA system and a second DMA system;
   determining whether the second mobile subscriber is located within a first wireless coverage area of the DMA network that is associated with the first DMA system based on information stored at a home location register (HLR) of the first DMA system and a visitor location register (VLR) of the first DMA system;
   when the second mobile subscriber is located within the first wireless coverage area, connecting the call to the second mobile subscriber via the first DMA system;
   when the second mobile subscriber is not located within the first wireless coverage area, determining whether the second mobile subscriber is located within a second wireless coverage area of the DMA network that is associated with the second DMA system based on information stored at a community location register (CLR) associated with the second DMA system, wherein the CLR associated with the second DMA system is stored at the first DMA system; and
   when the second mobile subscriber is not located within the first wireless coverage area and is not located within the second wireless coverage area, determining a preferred call path to route the call outside of the DMA network based on information stored at a destination preference register (DPR), wherein the DPR is stored at the first DMA system.

2. The method of claim 1, further comprising:
   routing the call outside of the DMA network via the preferred call path when the second mobile subscriber is not located within the first wireless coverage area and is not located within the second wireless coverage area.

3. The method of claim 1, further comprising:
   connecting the call via an Internet Protocol (IP) peer-to-peer connection between the first DMA system and the second DMA system when the second mobile subscriber is located within the second wireless coverage area.

4. The method of claim 1, wherein the CLR associated with the second DMA system includes information associated with a second HLR that is stored at the second DMA system.

5. The method of claim 1, wherein the preferred call path includes one of a first preferred Voice over Internet Protocol (VoIP) call path of a plurality of VoIP call paths, a first preferred mobile switching center (MSC) call path of a plurality of MSC call paths, and a first preferred Integrated Services Digital Network (ISDN) call path of a plurality of ISDN call paths.

6. The method of claim 1, wherein the preferred call path is determined based on information provided by the first mobile subscriber.

7. The method of claim 1, wherein the first DMA system is associated with a first preferred call path, and wherein the second DMA system is associated with a second preferred call path.

8. A method, comprising:
   receiving, at a first distributed mobile architecture (DMA) system of a DMA network, a call from a first mobile subscriber to a second mobile subscriber, wherein the DMA network includes at least the first DMA system, a second DMA system, and a third DMA system;

determining whether the second mobile subscriber is located within a first wireless coverage area of the DMA network that is associated with the first DMA system based on information stored at a home location register (HLR) of the first DMA system and a visitor location register (VLR) of the first DMA system;

when the second mobile subscriber is located within the first wireless coverage area, connecting the call to the second mobile subscriber via the first DMA system;

when the second mobile subscriber is not located within the first wireless coverage area, determining whether the second mobile subscriber is located within a second wireless coverage area of the DMA network that is associated with the second DMA system based on information stored at a community location register (CLR) associated with the second DMA system, wherein the CLR associated with the second DMA system is stored at the first DMA system;

when the second mobile subscriber is not located within the first wireless coverage area and is not located within the second wireless coverage area, determining whether the second mobile subscriber is located within a third wireless coverage area of the DMA network that is associated with the third DMA system based on information stored at a CLR associated with the third DMA system, wherein the CLR associated with the third DMA system is stored at the first DMA system; and when the second mobile subscriber is not located within any of the first wireless coverage area, the second wireless coverage area, and the third wireless coverage area, determining a preferred call path to route the call outside of the DMA network based on information stored at a destination preference register (DPR), wherein the DPR is stored at the first DMA system.

9. The method of claim 8, further comprising:

routing the call outside of the DMA network via the preferred call path when the second mobile subscriber is not located within any of the first wireless coverage area, the second wireless coverage area, and the third wireless coverage area.

10. The method of claim 8, further comprising:

connecting the call via an Internet Protocol (IP) peer-to-peer connection between the first DMA system and the second DMA system when the second mobile subscriber is located within the second wireless coverage area; and connecting the call via an IP peer-to-peer connection between the first DMA system and the third DMA system when the second mobile subscriber is located within the third wireless coverage area.

11. A distributed mobile architecture (DMA) system, comprising:

a housing;

a base transceiver station coupled to the housing, the base transceiver station operable to receive a call from a mobile subscriber;

a computer readable storage medium within the housing, the computer readable storage medium comprising:

an authentication, authorization, and accounting (AAA) module embedded within the computer readable storage medium, the AAA module comprising:

a home location register (HLR) that stores information associated with one or more mobile subscriber devices that are registered with the DMA system;

a visitor location register (VLR) that stores information associated with one or more roaming mobile subscriber devices that are temporarily registered with the DMA system;

a community location register (CLR) that stores information associated with a second HLR of a second DMA system, wherein the second HLR stores information associated with one or more mobile subscriber devices that are registered with the second DMA system; and a destination preference register (DPR) that stores one or more preferred call paths for calls to be routed outside of a DMA network that is accessible to the DMA system, wherein the DMA network includes at least the first DMA system and the second DMA system, a call routing component embedded within the computer readable storage medium, the call routing component comprising processor executable instructions to route the call via a particular preferred call path of the one or more preferred call paths stored at the DPR when the AAA module determines that the call is directed to a destination device that is outside of the DMA network.

12. The DMA system of claim 11, wherein the AAA module determines that the destination device is outside of the DMA network based on the information stored at the HLR, the information stored at the VLR, and the information stored at the CLR.

13. The DMA system of claim 11, further comprising a mobile switching center (MSC) interface that provides communication access to a mobile telephone network.

14. The DMA system of claim 11, further comprising a Voice over Internet Protocol (VoIP) interface that provides communication access to a VoIP network.

15. The DMA system of claim 11, further comprising an Integrated Services Digital Network (ISDN) interface that provides communication access to an ISDN network.

16. The DMA system of claim 11, wherein the particular preferred call path includes one of a Voice over Internet Protocol (VoIP) call path, a mobile switching center (MSC) call path, and an Integrated Services Digital Network (ISDN) call path.

17. The DMA system of claim 16, wherein the call is directed to a mobile directory number (MDN), and wherein the particular preferred call path is determined based on an MDN prefix.

18. The DMA system of claim 17, wherein the MDN prefix includes the first three digits of the MDN.

19. The DMA system of claim 17, wherein a first set of MDN prefixes is associated with the VoIP call path, a second set of MDN prefixes is associated with the MSC call path, and a third set of MDN prefixes is associated with the ISDN call path.

20. The DMA system of claim 11, wherein the AAA module further comprises:

a second CLR that stores information associated with a third HLR of a third DMA system of the DMA network, wherein the third HLR stores information associated with one or more mobile subscriber devices that are registered with the third DMA system.

21. The DMA system of claim 11, further comprising:

a mobile switching center (MSC) module embedded within the computer readable storage medium;

a base station controller (BSC) module embedded within the computer readable storage medium; and a call detail record (CDR) generation program embedded within the computer readable storage medium, the CDR generation program adapted to store a set of call detail records.

* * * * *